(12) United States Patent
Wu et al.

(10) Patent No.: US 12,294,525 B2
(45) Date of Patent: May 6, 2025

(54) DATA STREAM CLASSIFICATION MODEL UPDATING METHOD AND RELATED DEVICE

(71) Applicant: Huawei Technologies Co., Ltd., Shenzhen (CN)

(72) Inventors: Jun Wu, Nanjing (CN); Xinyu Hu, Nanjing (CN); Liang Zhang, Nanjing (CN); Huiying Xu, Dongguan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 315 days.

(21) Appl. No.: 17/896,943

(22) Filed: Aug. 26, 2022

(65) Prior Publication Data

US 2022/0407809 A1 Dec. 22, 2022

Related U.S. Application Data

(63) Continuation of application No. PCT/CN2020/119665, filed on Sep. 30, 2020.

(30) Foreign Application Priority Data

Feb. 28, 2020 (CN) .......................... 202010130637.8

(51) Int. Cl.
*H04L 47/2441* (2022.01)
*G06N 20/00* (2019.01)
(Continued)

(52) U.S. Cl.
CPC ......... *H04L 47/2441* (2013.01); *G06N 20/00* (2019.01); *H04L 41/145* (2013.01); *H04L 41/147* (2013.01); *H04L 47/2483* (2013.01)

(58) Field of Classification Search
None
See application file for complete search history.

(56) References Cited

U.S. PATENT DOCUMENTS

| | | | |
|---|---|---|---|
| 7,379,939 B2 * | 5/2008 | Aggarwal | ......... G06F 16/24568 |
| | | | 707/999.102 |
| 8,312,542 B2 * | 11/2012 | Eiland | ................. H04L 63/1416 |
| | | | 726/13 |

(Continued)

FOREIGN PATENT DOCUMENTS

| | | |
|---|---|---|
| CN | 101695035 A | 4/2010 |
| CN | 102315974 A | 1/2012 |

(Continued)

OTHER PUBLICATIONS

Liu, Y.Z. et al., "Research on Prediction and Classification over Data Streams," Computer Science, vol. 34, No. 11, 2007, 4 pages (with English Abstract).

*Primary Examiner* — Phyllis A Book
(74) *Attorney, Agent, or Firm* — Slater Matsil, LLP

(57) ABSTRACT

A data stream classification model updating method is disclosed. Determining, based on packet information of a current data stream and a behavior classification model, a first data stream class corresponding to the current data stream; determining, based on a target correspondence and a common feature of the current data stream, a second data stream class corresponding to the current data stream, where the target correspondence is a correspondence between a plurality of common features and a plurality of data stream classes; and if the first data stream class is different from the second data stream class, obtaining correction data corresponding to the current data stream, where the correction data includes the packet information of the current data stream and the second data stream class, and the correction data is used as a training sample to update the behavior classification model.

20 Claims, 8 Drawing Sheets

(51) Int. Cl.
*H04L 41/14* (2022.01)
*H04L 41/147* (2022.01)
*H04L 47/2483* (2022.01)

(56) References Cited

U.S. PATENT DOCUMENTS

| | | | |
|---|---|---|---|
| 8,418,249 B1* | 4/2013 | Nucci | G06F 21/552 |
| | | | 709/225 |
| 9,621,431 B1 | 4/2017 | Cardente et al. | |
| 2008/0082475 A1* | 4/2008 | Aggarwal | G06N 20/00 |
| | | | 706/48 |
| 2009/0281971 A1* | 11/2009 | Aggarwal | G06F 18/24 |
| | | | 706/12 |
| 2011/0040706 A1 | 2/2011 | Sen et al. | |
| 2016/0300049 A1* | 10/2016 | Guedalia | G06V 30/1985 |
| 2018/0197089 A1* | 7/2018 | Krasser | G06N 3/044 |
| 2018/0198800 A1* | 7/2018 | Krasser | H04L 63/1416 |
| 2019/0026466 A1* | 1/2019 | Krasser | G06N 7/01 |
| 2019/0228762 A1 | 7/2019 | Wang et al. | |
| 2019/0297096 A1* | 9/2019 | Ahmed | H04L 63/1441 |
| 2020/0113158 A1* | 4/2020 | Rishi | G06T 7/20 |
| 2020/0322237 A1 | 10/2020 | Luo et al. | |

FOREIGN PATENT DOCUMENTS

| | | |
|---|---|---|
| CN | 104468273 A | 3/2015 |
| CN | 107360032 A | 11/2017 |
| CN | 108667747 A | 10/2018 |
| CN | 109525587 A | 3/2019 |
| CN | 109961080 A | 7/2019 |
| CN | 110233769 A | 9/2019 |
| CN | 110781950 A | 2/2020 |
| CN | 111404833 A | 7/2020 |

\* cited by examiner

| IP address | Port | Protocol | Data stream class |
|---|---|---|---|
| 10.129.56.39 | 443 | TCP | Desktop cloud |
FIG. 5
| IP address | Port | Protocol | Data stream class |
|---|---|---|---|
| 10.129.56.40 | 444 | TCP | Video conference |
FIG. 6
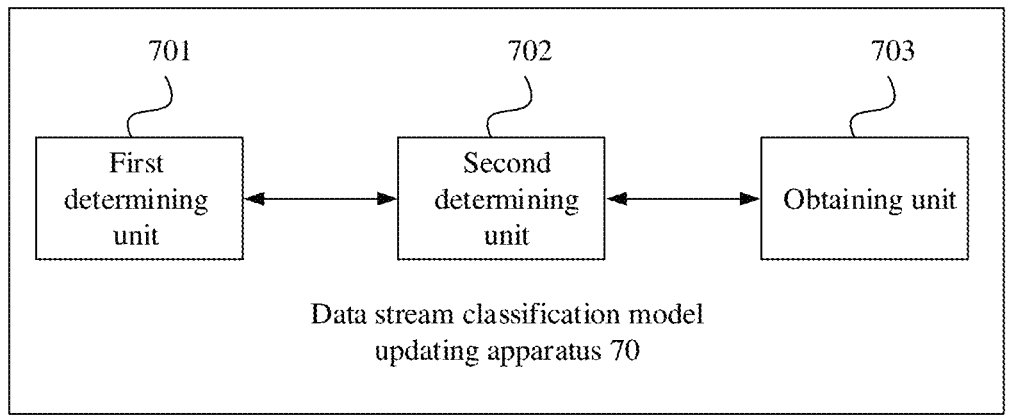
FIG. 7
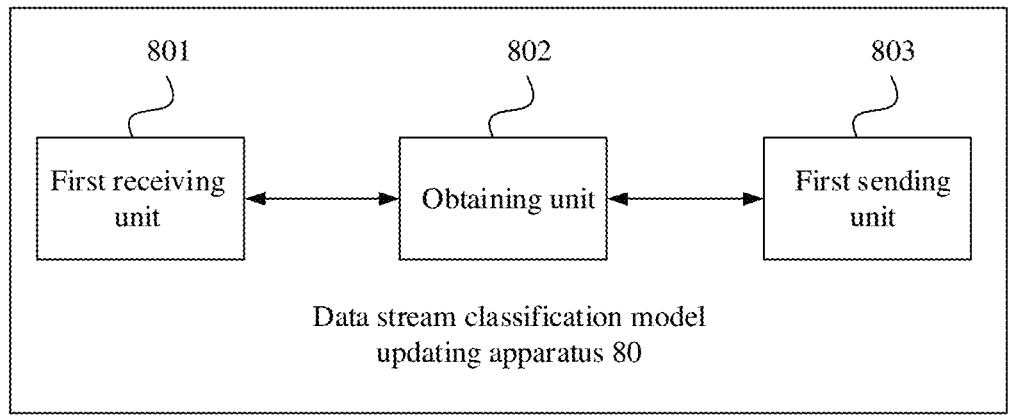
FIG. 8

DATA STREAM CLASSIFICATION MODEL UPDATING METHOD AND RELATED DEVICE

CROSS-REFERENCE TO RELATED APPLICATIONS

This application is a continuation of International Application No. PCT/CN2020/119665, filed on Sep. 30, 2020, which claims priority to Chinese Patent Application No. 202010130637.8, filed on Feb. 28, 2020. The disclosures of the aforementioned applications are hereby incorporated by reference in their entireties.

TECHNICAL FIELD

The present application relates to the field of computer technologies and the communication field, further to application of artificial intelligence (AI) in the field of computer technologies and the communication field, and in particular, to a data stream classification model updating method and a related device.

BACKGROUND

With rapid development of computer technologies, more enterprises use private office applications such as desktop cloud, voice conference, and video conference for work. Proper configuration of QoS priorities, real-time routing, and the like is usually needed to properly arrange service traffic and improve service reliability. However, an application type (namely, a data stream class) to which a current office application belongs needs to be first obtained for the proper configuration of the QoS priorities, the real-time routing, and the like.

Currently, a type of an office application is mainly obtained in the following manner: pre-collecting sample data, labeling the sample data manually or by using a third-party tool, training a model offline based on the labeled sample data by using a machine learning algorithm or a neural network algorithm, and predicting an application type of current network traffic by using the offline trained model. However, obtaining a training sample through manual labeling is low in efficiency.

SUMMARY

Embodiments of the present application disclose a data stream classification model updating method and a related device, to more efficiently obtain a training sample for updating a behavior classification model.

According to a first aspect, an embodiment of this application provides a data stream classification model updating method. The method includes determining, based on packet information of a current data stream and a behavior classification model, a first data stream class corresponding to the current data stream, where the packet information includes one or more of a packet length, a packet transmission speed, a packet time interval, and a packet direction, and the behavior classification model is a model obtained through training based on packet information and data stream classes of a plurality of data stream samples. The method further includes determining, based on a target correspondence and a common feature of the current data stream, a second data stream class corresponding to the current data stream, where the target correspondence is a correspondence between a plurality of common features and a plurality of data stream classes. The method also includes: if the first data stream class corresponding to the current data stream is different from the second data stream class corresponding to the current data stream, obtaining correction data corresponding to the current data stream, where the correction data corresponding to the current data stream includes the packet information of the current data stream and the second data stream class corresponding to the current data stream, and the correction data is used as a training sample to update the behavior classification model.

In the foregoing method, after the first data stream class is classified based on the behavior classification model, and the second data stream class is classified based on the preset correspondence about the common feature, if the first data stream class is different from the second data stream class, the correction data, namely, the training sample, for updating the behavior classification model is generated. The correction data is autonomously obtained by a device when the first data stream class corresponding to the current data stream is different from the second data stream class corresponding to the current data stream, and no manual labeling is required. Therefore, efficiency of obtaining sample data for training the behavior classification model is higher. In addition, the correction data includes the packet information and the accurate data stream class that are generated when a classification result of the behavior classification model is inaccurate. Therefore, the behavior classification model is subsequently updated based on the correction data, to obtain a behavior classification model with a more accurate classification effect.

With reference to the first aspect, in a first possible implementation of the first aspect, the determining, based on a target correspondence and a common feature of the current data stream, a second data stream class corresponding to the current data stream includes: if the common feature of the current data stream is the same as a first common feature in the correspondence, using a data stream class corresponding to the first common feature as the second data stream class corresponding to the current data stream.

With reference to the first aspect, in a second possible implementation of the first aspect, the common feature is a well-known port number or a well-known domain name system DNS.

With reference to the first aspect, in a third possible implementation of the first aspect, after the obtaining correction data corresponding to the current data stream, the method further includes: sending the correction data corresponding to the current data stream to a first device, where the correction data corresponding to the current data stream includes the packet information of the current data stream and the second data stream class corresponding to the current data stream; and receiving first model data sent by the first device, where the first model data is used to describe a new behavior classification model obtained by the first device by training the behavior classification model based on the packet information of the current data stream and the second data stream class corresponding to the current data stream.

In the method, the specified first device that has a strong computing capability implements the operation of obtaining the new behavior classification model through training. A third device may update the behavior classification model of the third device based on only a new model parameter sent by the first device. In this way, the third device can concentrate main computing resources on packet forwarding, to effectively ensure packet forwarding performance of the third device.

With reference to any one of the first aspect or the foregoing possible implementations of the first aspect, in a fourth possible implementation of the first aspect, after the obtaining correction data corresponding to the current data stream, the method further includes: updating the behavior classification model based on the correction data, to obtain a new behavior classification model.

In the method, a third device performs the operation of training the behavior classification model. This is equivalent to that the behavior classification model is used and trained on the same device.

With reference to any one of the first aspect or the foregoing possible implementations of the first aspect, in a fifth possible implementation of the first aspect, the updating the behavior classification model based on the correction data, to obtain a new behavior classification model includes: if first data stream classes corresponding to a total of M data streams have been currently different from second data stream classes corresponding to the M data streams, training the behavior classification model based on packet information of the M data streams and the second data stream classes respectively corresponding to the M data streams, to obtain the new behavior classification model, where the M data streams are an amount accumulated from a moment at which the behavior classification model becomes valid to a current moment or an amount accumulated within a preset time period, or a proportion of M in a total quantity of data streams that are transmitted after the behavior classification model becomes valid exceeds a preset threshold, where the M data streams include the current data stream.

In the method, there is a trigger condition for updating the behavior classification model. Specifically, it depends on whether the first data stream classes corresponding to the total of M data streams have been currently different from the second data stream classes corresponding to the M data streams. Proper configuration of M can prevent frequent update of the behavior classification model, to avoid unnecessary calculation overheads, and can avoid a problem of inaccurate prediction performed by the behavior classification model due to insufficient update frequency.

With reference to any one of the first aspect or the foregoing possible implementations of the first aspect, in a sixth possible implementation of the first aspect, the training the behavior classification model based on packet information of the M data streams and the second data stream classes respectively corresponding to the M data streams, to obtain the new behavior classification model includes: training the behavior classification model based on the packet information of the M data streams, the second data stream classes respectively corresponding to the M data streams, packet information of Y data streams, and second data stream classes respectively corresponding to the Y data streams, to obtain the new behavior classification model, where the Y data streams and the M data streams are from a same network; or the Y data streams and the M data streams are from at least two different networks, where the at least two different networks include two different local area networks, include two networks in different forms, or include two networks in different areas.

It may be understood that, generalization performance of the behavior classification model can be improved through training based on related information of data streams from different networks, to achieve a better prediction effect.

With reference to any one of the first aspect or the foregoing possible implementations of the first aspect, in a seventh possible implementation of the first aspect, if the Y data streams and the M data streams are from the at least two different networks, the training the behavior classification model based on the packet information of the M data streams, the second data stream classes respectively corresponding to the M data streams, packet information of Y data streams, and second data stream classes respectively corresponding to the Y data streams, to obtain the new behavior classification model includes: correcting the packet information of the Y data streams based on a difference between a network configuration of a second network to which the Y data streams belong and a network configuration of a first network to which the M data streams belong, to obtain corrected packet information of the Y data streams; and training the behavior classification model based on the packet information of the M data streams, the corrected packet information of the Y data streams, the second data stream classes corresponding to the M data streams, and the second data stream classes corresponding to the Y data streams, to obtain the new behavior classification model.

In the method, packet information of the data streams from the different networks is normalized, so that the packet information of the data streams from the different networks is more comparable, and the behavior classification model obtained through training based on normalized packet information has better generalization performance and higher prediction accuracy.

With reference to any one of the first aspect or the foregoing possible implementations of the first aspect, in an eighth possible implementation of the first aspect, the determining, based on packet information of a current data stream and a behavior classification model, a first data stream class corresponding to the current data stream includes: determining, based on the packet information and feature information of the current data stream, the behavior classification model, and a content classification model, the first data stream class corresponding to the current data stream, where the feature information includes one or more of a destination address and a protocol type, the content classification model is a model obtained based on feature information and one or more data stream class of one or more historical data streams, and the data stream class of the historical data stream is obtained based on the behavior classification model.

In the foregoing method, the first data stream class corresponding to the current data stream is obtained based on the content classification model and the behavior classification model, and then the first data stream class is corrected to obtain a final data stream class of the current data stream. The behavior classification model is pre-obtained through training based on the packet information and the data stream classes of the plurality of data stream samples, and the content classification model is obtained through training based on the feature information of the data stream and the data stream class classified by the behavior classification model. Therefore, the feature information, the packet information, and the like are analyzed by using the content classification model and the behavior classification model, so that the first data stream class corresponding to the current data stream can be more accurately predicted. In addition, because the data stream class that is in a data stream sample and that is used for training the content classification model is classified by the behavior classification model, there is no need to collect a large amount of data required for training, to avoid insufficient data integrity.

With reference to any one of the first aspect or the foregoing possible implementations of the first aspect, in a ninth possible implementation of the first aspect, the determining, based on the packet information and feature information of the current data stream, the behavior classification model, and a content classification model, the first data stream class corresponding to the current data stream includes: obtaining, based on the packet information of the current data stream and the behavior classification model, at least one first confidence that is of the current data stream and that corresponds to at least one data stream class; obtaining, based on the feature information of the current data stream and the content classification model, at least one second confidence that is of the current data stream and that corresponds to the at least one data stream class; and determining the first data stream class of the current data stream based on the at least one first confidence and the at least one second confidence.

With reference to any one of the first aspect or the foregoing possible implementations of the first aspect, in a tenth possible implementation of the first aspect, the determining the first data stream class of the current data stream based on the at least one first confidence and the at least one second confidence includes: calculating, based on the first confidence corresponding to a target data stream class, a weight value of the first confidence, the second confidence corresponding to the target data stream class, and a weight value of the second confidence, a comprehensive confidence corresponding to the target data stream class, where the target data stream class is any one of the at least one data stream class; and if the comprehensive confidence corresponding to the target data stream class is greater than a first preset threshold, determining the target data stream class as the first data stream class corresponding to the current data stream.

With reference to any one of the first aspect or the foregoing possible implementations of the first aspect, in an eleventh possible implementation of the first aspect, the method further includes: if the comprehensive confidence corresponding to the target data stream class is less than a second preset threshold, sending the feature information and the second data stream class of the current data stream to a second device, where the second preset threshold is greater than the first preset threshold; and receiving second model data sent by the second device, where the second model data is used to describe a new content classification model obtained by the second device by training the content classification model based on the feature information and the second data stream class of the current data stream.

In the foregoing method, the content classification model is updated by using a determining result of the data stream class of the current data stream. Specifically, the second preset threshold is introduced. When the comprehensive confidence corresponding to the first data stream class is less than the second preset threshold, related information of the current data stream is sent to the second device for training, to obtain the new content classification model, so that a next determining result is more accurate.

With reference to any one of the first aspect or the foregoing possible implementations of the first aspect, in a twelfth possible implementation of the first aspect, the method further includes: if the comprehensive confidence corresponding to the target data stream class is less than a second preset threshold, updating the content classification model based on the feature information and the second data stream class of the current data stream, to obtain a new content classification model, where the second preset threshold is greater than the first preset threshold.

In the foregoing method, the content classification model is updated by using a determining result of the data stream class of the current data stream. Specifically, the second preset threshold is introduced. When the comprehensive confidence corresponding to the first data stream class is less than the second preset threshold, training is performed based on related information of the current data stream, to obtain the new content classification model, so that a next determining result is more accurate.

With reference to any one of the first aspect or the foregoing possible implementations of the first aspect, in a thirteenth possible implementation of the first aspect, after the determining, based on a target correspondence and a common feature of the current data stream, a second data stream class corresponding to the current data stream, the method further includes: sending the second data stream class corresponding to the current data stream to an operations support system OSS, where information about the second data stream class of the current data stream is used by the OSS to generate a traffic control policy for the current data stream.

That is, after the data stream class of the current data stream is determined, related information of the data stream class of the current data stream is notified to the OSS. In this way, the OSS can generate the traffic control policy for the current data stream based on the data stream class of the current data stream. For example, when the first data stream class of the current data stream is a video stream of video conference, the traffic control policy corresponding to the current data stream is defined as a policy of preferential transmission, that is, when a plurality of data streams are to be transmitted, the current data stream is preferentially transmitted.

With reference to any one of the first aspect or the foregoing possible implementations of the first aspect, in a fourteenth possible implementation of the first aspect, the packet length includes one or more of an Ethernet frame length, an IP packet length, a transmission protocol packet length, and a header length in a packet, and a transmission protocol includes the transmission control protocol TCP and/or the user datagram protocol UDP.

According to a second aspect, an embodiment of this application provides a data stream classification model updating method. The method includes receiving correction data that corresponds to a current data stream and that is sent by a third device, where the correction data corresponding to the current data stream includes packet information of the current data stream and a second data stream class corresponding to the current data stream, the second data stream class corresponding to the current data stream is determined by the third device based on a target correspondence and a common feature of the current data stream, and the target correspondence is a correspondence between a plurality of common features and a plurality of data stream classes. The method further includes, if correction data corresponding to a total of M data streams is received from the third device, training a behavior classification model based on the correction data corresponding to the M data streams, to obtain a new behavior classification model, where the M data streams are an amount accumulated from a moment at which the behavior classification model becomes valid to a current moment or an amount accumulated within a preset time period, or a proportion of M in a total quantity of data streams that are transmitted after the behavior classification model becomes valid exceeds a preset threshold, where the M data streams include the current data stream; and sending first model data to the third device, where the first model data is used to describe the new behavior classification model, the behavior classification model is a model obtained based on packet information and data stream classes of a plurality of data stream samples, the behavior classification model is used to determine a data stream class of an input to-be-predicted data stream based on packet information of the to-be-predicted data stream, and the packet information includes one or more of a packet length, a packet transmission speed, a packet time interval, and a packet direction.

In the foregoing method, when a total of a specific amount of correction data is from the third device, a first device trains the behavior classification model based on the specific amount of correction data to obtain the new behavior classification model, and sends, to the third device when obtaining the new behavior classification model through training, information for describing the new behavior classification model, so that the third device updates the behavior classification model on the third device by using the information.

In the foregoing method, the third device does not need to perform model training, but directly obtains the new behavior classification model based on a model training result from the first device. This helps the third device fully use computing resources to classify a data stream class.

With reference to the second aspect, in a first possible implementation of the second aspect, the common feature is a well-known port number or a well-known domain name system DNS.

With reference to either of the second aspect and the foregoing possible implementation of the second aspect, in a second possible implementation of the second aspect, the correction data corresponding to the current data stream is sent by the third device when a first data stream class corresponding to the current data stream is different from the second data stream class corresponding to the current data stream, the first data stream class corresponding to the current data stream is determined by the third device based on the packet information and feature information of the current data stream, the behavior classification model, and a content classification model, the feature information includes one or more of a destination address and a protocol type, the content classification model is obtained based on feature information and one or more data stream classes of one or more historical data streams, and the data stream class of the historical data stream is obtained based on the behavior classification model.

With reference to any one of the second aspect or the foregoing possible implementations of the second aspect, in a third possible implementation of the second aspect, the training a behavior classification model based on the correction data corresponding to the M data streams, to obtain a new behavior classification model includes: training the behavior classification model based on the correction data corresponding to the M data streams and correction data corresponding to Y data streams, to obtain the new behavior classification model, where the Y data streams and the M data streams are from a same network; or the Y data streams and the M data streams are from at least two different networks, where the at least two different networks include two different local area networks, include two networks in different forms, or include two networks in different areas.

It may be understood that, generalization performance of the behavior classification model can be improved through training based on related information of data streams from different networks, to achieve a better prediction effect.

With reference to any one of the second aspect or the foregoing possible implementations of the second aspect, in a fourth possible implementation of the second aspect, if the Y data streams and the M data streams are from the at least two different networks, the training the behavior classification model based on the correction data corresponding to the M data streams and correction data corresponding to Y data streams, to obtain the new behavior classification model includes: correcting packet information of the Y data streams based on a difference between a network configuration of a second network to which the Y data streams belong and a network configuration of a first network to which the M data streams belong, to obtain corrected packet information of the Y data streams; and training the behavior classification model based on packet information of the M data streams, the corrected packet information of the Y data streams, second data stream classes corresponding to the M data streams, and second data stream classes corresponding to the Y data streams, to obtain the new behavior classification model.

In the method, packet information of the data streams from the different networks is normalized, so that the packet information of the data streams from the different networks is more comparable, and the behavior classification model obtained through training based on normalized packet information has better generalization performance and higher prediction accuracy.

With reference to any one of the second aspect or the foregoing possible implementations of the second aspect, in a fifth possible implementation of the second aspect, the method further includes: receiving the feature information and information about the second data stream class that are of the current data stream and that are sent by the third device; training the content classification model based on the feature information and the second data stream class of the current data stream, to obtain a new content classification model; and sending second model data to the third device, where the second model data is used to describe the new content classification model, the content classification model is a model obtained based on the feature information and the data stream class of the one or more historical data streams, the content classification model is used to estimate a data stream class of an input to-be-predicted data stream based on feature information of the to-be-predicted data stream, the data stream class of the historical data stream is obtained based on the behavior classification model, the behavior classification model is the model obtained based on the packet information and the data stream classes of the plurality of data stream samples, the packet information includes the one or more of the packet length, the packet transmission speed, the packet time interval, and the packet direction, and the feature information includes the one or more of the destination address and the protocol type.

In the foregoing method, in a process in which the third device classifies a data stream class by using the content classification model that has been obtained through training, if it is found that accuracy of the model is low, the third device triggers the first device to retrain the content classification model with reference to related data, and updates the content classification model on the third device after the new content classification model is obtained through training. This manner of iteratively updating the content classification model can meet differentiated requirements of different users, different networks, and different scenarios, and has better generalization performance and commonality.

According to a third aspect, an embodiment of this application provides a data stream classification model updating device. The device is a third device, and the third device includes a memory and a processor, where the memory is configured to store a computer program, and the processor invokes the computer program to perform the following operations: determining, based on packet information of a current data stream and a behavior classification model, a first data stream class corresponding to the current data stream, where the packet information includes one or more of a packet length, a packet transmission speed, a packet time interval, and a packet direction, and the behavior classification model is a model obtained through training based on packet information and data stream classes of a plurality of data stream samples; determining, based on a target correspondence and a common feature of the current data stream, a second data stream class corresponding to the current data stream, where the target correspondence is a correspondence between a plurality of common features and a plurality of data stream classes; and if the first data stream class corresponding to the current data stream is different from the second data stream class corresponding to the current data stream, obtaining correction data corresponding to the current data stream, where the correction data corresponding to the current data stream includes the packet information of the current data stream and the second data stream class corresponding to the current data stream, and the correction data is used as a training sample to update the behavior classification model.

In the foregoing method, after the first data stream class is classified based on the behavior classification model, and the second data stream class is classified based on the preset correspondence about the common feature, if the first data stream class is different from the second data stream class, the correction data, namely, the training sample, for updating the behavior classification model is generated. The correction data is autonomously obtained by the device when the first data stream class corresponding to the current data stream is different from the second data stream class corresponding to the current data stream, and no manual labeling is required. Therefore, efficiency of obtaining sample data for training the behavior classification model is higher. In addition, the correction data includes the packet information and the accurate data stream class that are generated when a classification result of the behavior classification model is inaccurate. Therefore, the behavior classification model is subsequently updated based on the correction data, to obtain a behavior classification model with a more accurate classification effect.

With reference to the third aspect, in a first possible implementation of the third aspect, when determining, based on the target correspondence and the common feature of the current data stream, the second data stream class corresponding to the current data stream, the processor is specifically configured to: if the common feature of the current data stream is the same as a first common feature in the correspondence, use a data stream class corresponding to the first common feature as the second data stream class corresponding to the current data stream.

With reference to either of the third aspect and the foregoing possible implementation of the third aspect, in a second possible implementation of the third aspect, the common feature is a well-known port number or a well-known domain name system DNS.

With reference to any one of the third aspect or the foregoing possible implementations of the third aspect, in a third possible implementation of the third aspect, the device further includes a communication interface, and after obtaining the correction data corresponding to the current data stream, the processor is further configured to: send, through the communication interface, the correction data corresponding to the current data stream to a first device, where the correction data corresponding to the current data stream includes the packet information of the current data stream and the second data stream class corresponding to the current data stream; and receive, through the communication interface, first model data sent by the first device, where the first model data is used to describe a new behavior classification model obtained by the first device by training the behavior classification model based on the packet information of the current data stream and the second data stream class corresponding to the current data stream.

In the method, the specified first device that has a strong computing capability implements the operation of obtaining the new behavior classification model through training. The third device may update the behavior classification model of the third device based on only a new model parameter sent by the first device. In this way, the third device can concentrate main computing resources on packet forwarding, to effectively ensure packet forwarding performance of the third device.

With reference to any one of the third aspect or the foregoing possible implementations of the third aspect, in a fourth possible implementation of the third aspect, after obtaining the correction data corresponding to the current data stream, the processor is specifically configured to update the behavior classification model based on the correction data, to obtain a new behavior classification model.

In the method, the third device performs the operation of training the behavior classification model. This is equivalent to that the behavior classification model is used and trained on the same device.

With reference to any one of the third aspect or the foregoing possible implementations of the third aspect, in a fifth possible implementation of the third aspect, when updating the behavior classification model based on the correction data, to obtain the new behavior classification model, the processor is specifically configured to: if first data stream classes corresponding to a total of M data streams have been currently different from second data stream classes corresponding to the M data streams, train the behavior classification model based on packet information of the M data streams and the second data stream classes respectively corresponding to the M data streams, to obtain the new behavior classification model, where the M data streams are an amount accumulated from a moment at which the behavior classification model becomes valid to a current moment or an amount accumulated within a preset time period, or a proportion of M in a total quantity of data streams that are transmitted after the behavior classification model becomes valid exceeds a preset threshold, where the M data streams include the current data stream, and M is a preset reference threshold.

In the method, there is a trigger condition for updating the behavior classification model. Specifically, it depends on whether the first data stream classes corresponding to the total of M data streams have been currently different from the second data stream classes corresponding to the M data streams. Proper configuration of M can prevent frequent update of the behavior classification model, to avoid unnecessary calculation overheads, and can avoid a problem of inaccurate prediction performed by the behavior classification model due to insufficient update frequency.

With reference to any one of the third aspect or the foregoing possible implementations of the third aspect, in a sixth possible implementation of the third aspect, when training the behavior classification model based on the packet information of the M data streams and the second data stream classes respectively corresponding to the M data streams, to obtain the new behavior classification model, the processor is specifically configured to: train the behavior classification model based on the packet information of the M data streams, the second data stream classes respectively corresponding to the M data streams, packet information of Y data streams, and second data stream classes respectively corresponding to the Y data streams, to obtain the new behavior classification model, where the Y data streams and the M data streams are from a same network; or the Y data streams and the M data streams are from at least two different networks, where the at least two different networks include two different local area networks, include two networks in different forms, or include two networks in different areas.

It may be understood that, generalization performance of the behavior classification model can be improved through training based on related information of data streams from different networks, to achieve a better prediction effect.

With reference to any one of the third aspect or the foregoing possible implementations of the third aspect, in a seventh possible implementation of the third aspect, if the Y data streams and the M data streams are from the at least two different networks, when training the behavior classification model based on the packet information of the M data streams, the second data stream classes respectively corresponding to the M data streams, the packet information of the Y data streams, and the second data stream classes respectively corresponding to the Y data streams, to obtain the new behavior classification model, the processor is specifically configured to: correct the packet information of the Y data streams based on a difference between a network configuration of a second network to which the Y data streams belong and a network configuration of a first network to which the M data streams belong, to obtain corrected packet information of the Y data streams; and train the behavior classification model based on the packet information of the M data streams, the corrected packet information of the Y data streams, the second data stream classes corresponding to the M data streams, and the second data stream classes corresponding to the Y data streams, to obtain the new behavior classification model.

In the method, packet information of the data streams from the different networks is normalized, so that the packet information of the data streams from the different networks is more comparable, and the behavior classification model obtained through training based on normalized packet information has better generalization performance and higher prediction accuracy.

With reference to any one of the third aspect or the foregoing possible implementations of the third aspect, in an eighth possible implementation of the third aspect, when determining, based on the packet information of the current data stream and the behavior classification model, the first data stream class corresponding to the current data stream, the processor is specifically configured to: determine, based on the packet information and feature information of the current data stream, the behavior classification model, and a content classification model, the first data stream class corresponding to the current data stream, where the feature information includes one or more of a destination address and a protocol type, the content classification model is a model obtained based on feature information and one or more data stream class of one or more historical data streams, and the data stream class of the historical data stream is obtained based on the behavior classification model.

In the foregoing method, the first data stream class corresponding to the current data stream is specifically obtained based on the content classification model and the behavior classification model, and then the first data stream class is corrected to obtain a final data stream class of the current data stream. The behavior classification model is pre-obtained through training based on the packet information and the data stream classes of the plurality of data stream samples, and the content classification model is obtained through training based on the feature information of the data stream and the data stream class classified by the behavior classification model. Therefore, the feature information, the packet information, and the like are analyzed by using the content classification model and the behavior classification model, so that the first data stream class corresponding to the current data stream can be more accurately predicted. In addition, because the data stream class that is in a data stream sample and that is used for training the content classification model is classified by the behavior classification model, there is no need to collect a large amount of data required for training, to avoid insufficient data integrity.

With reference to any one of the third aspect or the foregoing possible implementations of the third aspect, in a ninth possible implementation of the third aspect, when determining, based on the packet information and the feature information of the current data stream, the behavior classification model, and the content classification model, the first data stream class corresponding to the current data stream, the processor is specifically configured to: obtain, based on the packet information of the current data stream and the behavior classification model, at least one first confidence that is of the current data stream and that corresponds to at least one data stream class; obtain, based on the feature information of the current data stream and the content classification model, at least one second confidence that is of the current data stream and that corresponds to the at least one data stream class; and determine the first data stream class of the current data stream based on the at least one first confidence and the at least one second confidence.

With reference to any one of the third aspect or the foregoing possible implementations of the third aspect, in a tenth possible implementation of the third aspect, when determining the first data stream class of the current data stream based on the at least one first confidence and the at least one second confidence, the processor is specifically configured to: calculate, based on the first confidence corresponding to a target data stream class, a weight value of the first confidence, the second confidence corresponding to the target data stream class, and a weight value of the second confidence, a comprehensive confidence corresponding to the target data stream class, where the target data stream class is any one of the at least one data stream class; and if the comprehensive confidence corresponding to the target data stream class is greater than a first preset threshold, determine the target data stream class as the first data stream class corresponding to the current data stream.

With reference to any one of the third aspect or the foregoing possible implementations of the third aspect, in an eleventh possible implementation of the third aspect, the device further includes a communication interface, and the processor is further configured to: if the comprehensive confidence corresponding to the target data stream class is less than a second preset threshold, send the feature information and the second data stream class of the current data stream to a second device through the communication interface, where the second preset threshold is greater than the first preset threshold; and receive, through the communication interface, second model data sent by the second device, where the second model data is used to describe a new content classification model obtained by the second device by training the content classification model based on the feature information and the second data stream class of the current data stream.

In the foregoing method, the content classification model is updated by using a determining result of the data stream class of the current data stream. Specifically, the second preset threshold is introduced. When the comprehensive confidence corresponding to the first data stream class is less than the second preset threshold, related information of the current data stream is sent to the second device for training, to obtain the new content classification model, so that a next determining result is more accurate.

With reference to any one of the third aspect or the foregoing possible implementations of the third aspect, in a twelfth possible implementation of the third aspect, the processor is further configured to: if the comprehensive confidence corresponding to the target data stream class is less than a second preset threshold, update the content classification model based on the feature information and the second data stream class of the current data stream, to obtain a new content classification model, where the second preset threshold is greater than the first preset threshold.

In the foregoing method, the content classification model is updated by using a determining result of the data stream class of the current data stream. Specifically, the second preset threshold is introduced. When the comprehensive confidence corresponding to the first data stream class is less than the second preset threshold, training is performed based on related information of the current data stream, to obtain the new content classification model, so that a next determining result is more accurate.

With reference to any one of the third aspect or the foregoing possible implementations of the third aspect, in a thirteenth possible implementation of the third aspect, after determining, based on the target correspondence and the common feature of the current data stream, the second data stream class corresponding to the current data stream, the processor is further configured to: send the second data stream class corresponding to the current data stream to an operations support system OSS through the communication interface, where information about the second data stream class of the current data stream is used by the OSS to generate a traffic control policy for the current data stream.

That is, after the data stream class of the current data stream is determined, related information of the data stream class of the current data stream is notified to the OSS. In this way, the OSS can generate the traffic control policy for the current data stream based on the data stream class of the current data stream. For example, when the first data stream class of the current data stream is a video stream of video conference, the traffic control policy corresponding to the current data stream is defined as a policy of preferential transmission, that is, when a plurality of data streams are to be transmitted, the current data stream is preferentially transmitted.

With reference to any one of the third aspect or the foregoing possible implementations of the third aspect, in a fourteenth possible implementation of the third aspect, the packet length includes one or more of an Ethernet frame length, an IP packet length, a transmission protocol packet length, and a header length in a packet, and a transmission protocol includes the transmission control protocol TCP and/or the user datagram protocol UDP.

According to a fourth aspect, an embodiment of this application provides a data stream classification model updating device. The device is a first device, and the first device includes a memory, a processor, and a communication interface, where the memory is configured to store a computer program, and the processor invokes the computer program to perform the following operations: receiving, through the communication interface, correction data that corresponds to a current data stream and that is sent by a third device, where the correction data corresponding to the current data stream includes packet information of the current data stream and a second data stream class corresponding to the current data stream, the second data stream class corresponding to the current data stream is determined by the third device based on a target correspondence and a common feature of the current data stream, and the target correspondence is a correspondence between a plurality of common features and a plurality of data stream classes; if correction data corresponding to a total of M data streams is received from the third device, training a behavior classification model based on the correction data corresponding to the M data streams, to obtain a new behavior classification model, where the M data streams are an amount accumulated from a moment at which the behavior classification model becomes valid to a current moment or an amount accumulated within a preset time period, or a proportion of M in a total quantity of data streams that are transmitted after the behavior classification model becomes valid exceeds a preset threshold, where the M data streams include the current data stream; and sending first model data to the third device through the communication interface, where the first model data is used to describe the new behavior classification model, the behavior classification model is a model obtained based on packet information and data stream classes of a plurality of data stream samples, the behavior classification model is used to determine a data stream class of an input to-be-predicted data stream based on packet information of the to-be-predicted data stream, and the packet information includes one or more of a packet length, a packet transmission speed, a packet time interval, and a packet direction.

In the foregoing method, when a total of a specific amount of correction data is from the third device, the first device trains the behavior classification model based on the specific amount of correction data to obtain the new behavior classification model, and sends, to the third device when obtaining the new behavior classification model through training, information for describing the new behavior classification model, so that the third device updates the behavior classification model on the third device by using the information.

In the foregoing method, the third device does not need to perform model training, but directly obtains the new behavior classification model based on a model training result from the first device. This helps the third device fully use computing resources to classify a data stream class.

With reference to the fourth aspect, in a first possible implementation of the fourth aspect, the common feature is a well-known port number or a well-known domain name system DNS.

With reference to either of the fourth aspect and the foregoing possible implementation of the fourth aspect, in a second possible implementation of the fourth aspect, the correction data corresponding to the current data stream is sent by the third device when a first data stream class corresponding to the current data stream is different from the second data stream class corresponding to the current data stream, the first data stream class corresponding to the current data stream is determined by the third device based on the packet information and feature information of the current data stream, the behavior classification model, and a content classification model, the feature information includes one or more of a destination address and a protocol type, the content classification model is obtained based on feature information and one or more data stream class of one or more historical data streams, and the data stream class of the historical data stream is obtained based on the behavior classification model.

With reference to any one of the fourth aspect or the foregoing possible implementations of the fourth aspect, in a third possible implementation of the fourth aspect, when training the behavior classification model based on the correction data corresponding to the M data streams, to obtain the new behavior classification model, the processor is specifically configured to: train the behavior classification model based on the correction data corresponding to the M data streams and correction data corresponding to Y data streams, to obtain the new behavior classification model, where the Y data streams and the M data streams are from a same network; or the Y data streams and the M data streams are from at least two different networks, where the at least two different networks include two different local area networks, include two networks in different forms, or include two networks in different areas.

It may be understood that, generalization performance of the behavior classification model can be improved through training based on related information of data streams from different networks, to achieve a better prediction effect.

With reference to any one of the fourth aspect or the foregoing possible implementations of the fourth aspect, in a fourth possible implementation of the fourth aspect, if the Y data streams and the M data streams are from the at least two different networks, when training the behavior classification model based on the correction data corresponding to the M data streams and the correction data corresponding to the Y data streams, to obtain the new behavior classification model, the processor is specifically configured to: correct packet information of the Y data streams based on a difference between a network configuration of a second network to which the Y data streams belong and a network configuration of a first network to which the M data streams belong, to obtain corrected packet information of the Y data streams; and train the behavior classification model based on packet information of the M data streams, the corrected packet information of the Y data streams, second data stream classes corresponding to the M data streams, and second data stream classes corresponding to the Y data streams, to obtain the new behavior classification model.

In the method, packet information of the data streams from the different networks is normalized, so that the packet information of the data streams from the different networks is more comparable, and the behavior classification model obtained through training based on normalized packet information has better generalization performance and higher prediction accuracy.

With reference to any one of the fourth aspect or the foregoing possible implementations of the fourth aspect, in a fifth possible implementation of the fourth aspect, the processor is further configured to: receive, through the communication interface, the feature information and the second data stream class of the current data stream that are sent by the third device; train the content classification model based on the feature information and the second data stream class of the current data stream, to obtain a new content classification model; and send second model data to the third device through the communication interface, where the second model data is used to describe the new content classification model, the content classification model is a model obtained based on the feature information and the data stream class of the one or more historical data streams, the content classification model is used to estimate a data stream class of an input to-be-predicted data stream based on feature information of the to-be-predicted data stream, the data stream class of the historical data stream is obtained based on the behavior classification model, the behavior classification model is the model obtained based on the packet information and the data stream classes of the plurality of data stream samples, the packet information includes the one or more of the packet length, the packet transmission speed, the packet time interval, and the packet direction, and the feature information includes the one or more of the destination address and the protocol type.

In the foregoing method, in a process in which the third device classifies a data stream class by using the content classification model that has been obtained through training, if it is found that accuracy of the model is low, the third device triggers the first device to retrain the content classification model with reference to related data, and updates the content classification model on the third device after the new content classification model is obtained through training. This manner of iteratively updating the content classification model can meet differentiated requirements of different users, different networks, and different scenarios, and has better generality performance and commonality.

According to a fifth aspect, an embodiment of this application provides a data stream classification model updating apparatus, where the apparatus is a third device or a module or a component in the third device, and includes: a first determining unit, configured to determine, based on packet information of a current data stream and a behavior classification model, a first data stream class corresponding to the current data stream, where the packet information includes one or more of a packet length, a packet transmission speed, a packet time interval, and a packet direction, and the behavior classification model is a model obtained through training based on packet information and data stream classes of a plurality of data stream samples; a second determining unit, configured to determine, based on a target correspondence and a common feature of the current data stream, a second data stream class corresponding to the current data stream, where the target correspondence is a correspondence between a plurality of common features and a plurality of data stream classes; and an obtaining unit, configured to: when the first data stream class corresponding to the current data stream is different from the second data stream class corresponding to the current data stream, obtain correction data corresponding to the current data stream, where the correction data corresponding to the current data stream includes the packet information of the current data stream and the second data stream class corresponding to the current data stream, and the correction data is used as a training sample to update the behavior classification model.

In the foregoing method, after the first data stream class is classified based on the behavior classification model, and the second data stream class is classified based on the preset correspondence about the common feature, if the first data stream class is different from the second data stream class, the correction data, namely, the training sample, for updating the behavior classification model is generated. The correction data is autonomously obtained by the device when the first data stream class corresponding to the current data stream is different from the second data stream class corresponding to the current data stream, and no manual labeling is required. Therefore, efficiency of obtaining sample data for training the behavior classification model is higher. In addition, the correction data includes the packet information and the accurate data stream class that are generated when a classification result of the behavior classification model is inaccurate. Therefore, the behavior classification model is subsequently updated based on the correction data, to obtain a behavior classification model with a more accurate classification effect.

With reference to the fifth aspect, in a first possible implementation of the fifth aspect, when determining, based on the target correspondence and the common feature of the current data stream, the second data stream class corresponding to the current data stream, the second determining unit is specifically configured to: if the common feature of the current data stream is the same as a first common feature in the correspondence, use a data stream class corresponding to the first common feature as the second data stream class corresponding to the current data stream.

With reference to the fifth aspect, in a second possible implementation of the fifth aspect, the common feature is a well-known port number or a well-known domain name system DNS.

With reference to the fifth aspect, in a third possible implementation of the fifth aspect, the apparatus further includes: a first sending unit, configured to: after the obtaining unit obtains the correction data corresponding to the current data stream, send the correction data corresponding to the current data stream to a first device, where the correction data corresponding to the current data stream includes the packet information of the current data stream and the second data stream class corresponding to the current data stream; and a first receiving unit, configured to receive first model data sent by the first device, where the first model data is used to describe a new behavior classification model obtained by the first device by training the behavior classification model based on the packet information of the current data stream and the second data stream class corresponding to the current data stream.

In the method, the specified first device that has a strong computing capability implements the operation of obtaining the new behavior classification model through training. The third device may update the behavior classification model of the third device based on only a new model parameter sent by the first device. In this way, the third device can concentrate main computing resources on packet forwarding, to effectively ensure packet forwarding performance of the third device.

With reference to any one of the fifth aspect or the foregoing possible implementations of the fifth aspect, in a fourth possible implementation of the fifth aspect, the apparatus further includes: a first updating unit, configured to: after the obtaining unit obtains the correction data corresponding to the current data stream, update the behavior classification model based on the correction data, to obtain a new behavior classification model.

In the method, the third device performs the operation of training the behavior classification model. This is equivalent to that the behavior classification model is used and trained on the same device.

With reference to any one of the fifth aspect or the foregoing possible implementations of the fifth aspect, in a fifth possible implementation of the fifth aspect, when updating the behavior classification model based on the correction data, to obtain the new behavior classification model, the first updating unit is specifically configured to: if first data stream classes corresponding to a total of M data streams have been currently different from second data stream classes corresponding to the M data streams, train the behavior classification model based on packet information of the M data streams and the second data stream classes respectively corresponding to the M data streams, to obtain the new behavior classification model, where the M data streams are an amount accumulated from a moment at which the behavior classification model becomes valid to a current moment or an amount accumulated within a preset time period, or a proportion of M in a total quantity of data streams that are transmitted after the behavior classification model becomes valid exceeds a preset threshold, where the M data streams include the current data stream.

In the method, there is a trigger condition for updating the behavior classification model. Specifically, it depends on whether the first data stream classes corresponding to the total of M data streams have been currently different from the second data stream classes corresponding to the M data streams. Proper configuration of M can prevent frequent update of the behavior classification model, to avoid unnecessary calculation overheads, and can avoid a problem of inaccurate prediction performed by the behavior classification model due to insufficient update frequency.

With reference to any one of the fifth aspect or the foregoing possible implementations of the fifth aspect, in a sixth possible implementation of the fifth aspect, when training the behavior classification model based on the packet information of the M data streams and the second data stream classes respectively corresponding to the M data streams, to obtain the new behavior classification model, the first updating unit is specifically configured to: train the behavior classification model based on the packet information of the M data streams, the second data stream classes respectively corresponding to the M data streams, packet information of Y data streams, and second data stream classes respectively corresponding to the Y data streams, to obtain the new behavior classification model, where the Y data streams and the M data streams are from a same network; or the Y data streams and the M data streams are from at least two different networks, where the at least two different networks include two different local area networks, include two networks in different forms, or include two networks in different areas.

It may be understood that, generalization performance of the behavior classification model can be improved through training based on related information of data streams from different networks, to achieve a better prediction effect.

With reference to any one of the fifth aspect or the foregoing possible implementations of the fifth aspect, in a seventh possible implementation of the fifth aspect, if the Y data streams and the M data streams are from the at least two different networks, when training the behavior classification model based on the packet information of the M data streams, the second data stream classes respectively corresponding to the M data streams, the packet information of the Y data streams, and the second data stream classes respectively corresponding to the Y data streams, to obtain the new behavior classification model, the first updating unit is specifically configured to: correct the packet information of the Y data streams based on a difference between a network configuration of a second network to which the Y data streams belong and a network configuration of a first network to which the M data streams belong, to obtain corrected packet information of the Y data streams; and train the behavior classification model based on the packet information of the M data streams, the corrected packet information of the Y data streams, the second data stream classes corresponding to the M data streams, and the second data stream classes corresponding to the Y data streams, to obtain the new behavior classification model.

In the method, packet information of the data streams from the different networks is normalized, so that the packet information of the data streams from the different networks is more comparable, and the behavior classification model obtained through training based on normalized packet information has better generalization performance and higher prediction accuracy.

With reference to any one of the fifth aspect or the foregoing possible implementations of the fifth aspect, in an eighth possible implementation of the fifth aspect, when determining, based on the packet information of the current data stream and the behavior classification model, the first data stream class corresponding to the current data stream, the first determining unit is specifically configured to: determine, based on the packet information and feature information of the current data stream, the behavior classification model, and a content classification model, the first data stream class corresponding to the current data stream, where the feature information includes one or more of a destination address and a protocol type, the content classification model is a model obtained based on feature information and one or more data stream class of one or more historical data streams, and the data stream class of the historical data stream is obtained based on the behavior classification model.

In the foregoing method, the first data stream class corresponding to the current data stream is obtained based on the content classification model and the behavior classification model, and then the first data stream class is corrected to obtain a final data stream class of the current data stream. The behavior classification model is pre-obtained through training based on the packet information and the data stream classes of the plurality of data stream samples, and the content classification model is obtained through training based on the feature information of the data stream and the data stream class classified by the behavior classification model. Therefore, the feature information, the packet information, and the like are analyzed by using the content classification model and the behavior classification model, so that the first data stream class corresponding to the current data stream can be more accurately predicted. In addition, because the data stream class that is in a data stream sample and that is used for training the content classification model is classified by the behavior classification model, there is no need to collect a large amount of data required for training, to avoid insufficient data integrity.

With reference to any one of the fifth aspect or the foregoing possible implementations of the fifth aspect, in a ninth possible implementation of the fifth aspect, when determining, based on the packet information and the feature information of the current data stream, the behavior classification model, and the content classification model, the first data stream class corresponding to the current data stream, the first determining unit is specifically configured to: obtain, based on the packet information of the current data stream and the behavior classification model, at least one first confidence that is of the current data stream and that corresponds to at least one data stream class; obtain, based on the feature information of the current data stream and the content classification model, at least one second confidence that is of the current data stream and that corresponds to the at least one data stream class; and determine the first data stream class of the current data stream based on the at least one first confidence and the at least one second confidence.

With reference to any one of the fifth aspect or the foregoing possible implementations of the fifth aspect, in a tenth possible implementation of the fifth aspect, when determining the first data stream class of the current data stream based on the at least one first confidence and the at least one second confidence, the first determining unit is specifically configured to: calculate, based on the first confidence corresponding to a target data stream class, a weight value of the first confidence, the second confidence corresponding to the target data stream class, and a weight value of the second confidence, a comprehensive confidence corresponding to the target data stream class, where the target data stream class is any one of the at least one data stream class; and if the comprehensive confidence corresponding to the target data stream class is greater than a first preset threshold, determine the target data stream class as the first data stream class corresponding to the current data stream.

With reference to any one of the fifth aspect or the foregoing possible implementations of the fifth aspect, in an eleventh possible implementation of the fifth aspect, the apparatus further includes: a second sending unit, configured to: when the comprehensive confidence corresponding to the target data stream class is less than a second preset threshold, send the feature information and the second data stream class of the current data stream to a second device, where the second preset threshold is greater than the first preset threshold; and a second receiving unit, configured to receive second model data sent by the second device, where the second model data is used to describe a new content classification model obtained by the second device based on the feature information and the second data stream class of the current data stream.

In the foregoing method, the content classification model is updated by using a determining result of the data stream class of the current data stream. Specifically, the second preset threshold is introduced. When the comprehensive confidence corresponding to the first data stream class is less than the second preset threshold, related information of the current data stream is sent to the second device for training, to obtain the new content classification model, so that a next determining result is more accurate.

With reference to any one of the fifth aspect or the foregoing possible implementations of the fifth aspect, in a twelfth possible implementation of the fifth aspect, the apparatus further includes: a second updating unit, configured to: when the comprehensive confidence corresponding to the target data stream class is less than a second preset threshold, update the content classification model based on the feature information and the second data stream class of the current data stream, to obtain a new content classification model, where the second preset threshold is greater than the first preset threshold.

In the foregoing method, the content classification model is updated by using a determining result of the data stream class of the current data stream. Specifically, the second preset threshold is introduced. When the comprehensive confidence corresponding to the first data stream class is less than the second preset threshold, training is performed based on related information of the current data stream, to obtain the new content classification model, so that a next determining result is more accurate.

With reference to any one of the fifth aspect or the foregoing possible implementations of the fifth aspect, in a thirteenth possible implementation of the fifth aspect, the apparatus further includes: a third sending unit, configured to: after the second determining unit determines, based on the target correspondence and the common feature of the current data stream, the second data stream class corresponding to the current data stream, send the second data stream class corresponding to the current data stream to an operations support system OSS, where information about the second data stream class of the current data stream is used by the OSS to generate a traffic control policy for the current data stream.

That is, after the data stream class of the current data stream is determined, related information of the data stream class of the current data stream is notified to the OSS. In this way, the OSS can generate the traffic control policy for the current data stream based on the data stream class of the current data stream. For example, when the first data stream class of the current data stream is a video stream of video conference, the traffic control policy corresponding to the current data stream is defined as a policy of preferential transmission, that is, when a plurality of data streams are to be transmitted, the current data stream is preferentially transmitted.

With reference to any one of the fifth aspect or the foregoing possible implementations of the fifth aspect, in a fourteenth possible implementation of the fifth aspect, the packet length includes one or more of an Ethernet frame length, an IP packet length, a transmission protocol packet length, and a header length in a packet, and a transmission protocol includes the transmission control protocol TCP and/or the user datagram protocol UDP.

According to a sixth aspect, an embodiment of this application provides a data stream classification model updating apparatus, where the apparatus is a first device or a module or a component in the first device, and includes: a first receiving unit, configured to receive correction data that corresponds to a current data stream and that is sent by a third device, where the correction data corresponding to the current data stream includes packet information of the current data stream and a second data stream class corresponding to the current data stream, the second data stream class corresponding to the current data stream is determined by the third device based on a target correspondence and a common feature of the current data stream, and the target correspondence is a correspondence between a plurality of common features and a plurality of data stream classes; an obtaining unit, configured to: when correction data corresponding to a total of M data streams is received from the third device, train a behavior classification model based on the correction data corresponding to the M data streams, to obtain a new behavior classification model, where the M data streams are an amount accumulated from a moment at which the behavior classification model becomes valid to a current moment or an amount accumulated within a preset time period, or a proportion of M in a total quantity of data streams that are transmitted after the behavior classification model becomes valid exceeds a preset threshold, where the M data streams include the current data stream; and a first sending unit, configured to send first model data to the third device, where the first model data is used to describe the new behavior classification model, the behavior classification model is a model obtained based on packet information and data stream classes of a plurality of data stream samples, the behavior classification model is used to determine a data stream class of an input to-be-predicted data stream based on packet information of the to-be-predicted data stream, and the packet information includes one or more of a packet length, a packet transmission speed, a packet time interval, and a packet direction.

In the foregoing method, when a total of a specific amount of correction data is from the third device, the first device trains the behavior classification model based on the specific amount of correction data to obtain the new behavior classification model, and sends, to the third device when obtaining the new behavior classification model through training, information for describing the new behavior classification model, so that the third device updates the behavior classification model on the third device by using the information. In the foregoing method, the third device does not need to perform model training, but directly obtains the new behavior classification model based on a model training result from the first device. This helps the third device fully use computing resources to classify a data stream class.

With reference to the sixth aspect, in a first possible implementation of the sixth aspect, the common feature is a well-known port number or a well-known domain name system DNS.

With reference to either of the sixth aspect and the foregoing possible implementation of the sixth aspect, in a second possible implementation of the sixth aspect, the correction data corresponding to the current data stream is sent by the third device when a first data stream class corresponding to the current data stream is different from the second data stream class corresponding to the current data stream, the first data stream class corresponding to the current data stream is determined by the third device based on the packet information and feature information of the current data stream, the behavior classification model, and a content classification model, the feature information includes one or more of a destination address and a protocol type, the content classification model is obtained based on feature information and one or more data stream class of one or more historical data streams, and the data stream class of the historical data stream is obtained based on the behavior classification model.

With reference to any one of the sixth aspect or the foregoing possible implementations of the sixth aspect, in a third possible implementation of the sixth aspect, when training the behavior classification model based on the correction data corresponding to the M data streams, to obtain the new behavior classification model, the obtaining unit is specifically configured to: train the behavior classification model based on the correction data corresponding to the M data streams and correction data corresponding to Y data streams, to obtain the new behavior classification model, where the Y data streams and the M data streams are from a same network; or the Y data streams and the M data streams are from at least two different networks, where the at least two different networks include two different local area networks, include two networks in different forms, or include two networks in different areas.

It may be understood that, generalization performance of the behavior classification model can be improved through training based on related information of data streams from different networks, to achieve a better prediction effect.

With reference to any one of the sixth aspect or the foregoing possible implementations of the sixth aspect, in a fourth possible implementation of the sixth aspect, if the Y data streams and the M data streams are from the at least two different networks, when training the behavior classification model based on the correction data corresponding to the M data streams and the correction data corresponding to the Y data streams, to obtain the new behavior classification model, the obtaining unit is specifically configured to: correct packet information of the Y data streams based on a difference between a network configuration of a second network to which the Y data streams belong and a network configuration of a first network to which the M data streams belong, to obtain corrected packet information of the Y data streams; and train the behavior classification model based on packet information of the M data streams, the corrected packet information of the Y data streams, second data stream classes corresponding to the M data streams, and second data stream classes corresponding to the Y data streams, to obtain the new behavior classification model.

In the method, packet information of the data streams from the different networks is normalized, so that the packet information of the data streams from the different networks is more comparable, and the behavior classification model obtained through training based on normalized packet information has better generalization performance and higher prediction accuracy.

With reference to any one of the sixth aspect or the foregoing possible implementations of the sixth aspect, in a fifth possible implementation of the sixth aspect, the apparatus further includes: a second receiving unit, configured to receive the feature information and information about the second data stream class that are of the current data stream and that are sent by the third device; a generation unit, configured to train the content classification model based on the feature information and the second data stream class of the current data stream, to obtain a new content classification model; and a second sending unit, configured to send second model data to the third device, where the second model data is used to describe the new content classification model, the content classification model is a model obtained based on the feature information and the data stream class of the one or more historical data streams, the content classification model is used to estimate a data stream class of an input to-be-predicted data stream based on feature information of the to-be-predicted data stream, the data stream class of the historical data stream is obtained based on the behavior classification model, the behavior classification model is the model obtained based on the packet information and the data stream classes of the plurality of data stream samples, the packet information includes the one or more of the packet length, the packet transmission speed, the packet time interval, and the packet direction, and the feature information includes the tone or more of the destination address and the protocol type.

In the foregoing method, in a process in which the third device classifies a data stream class by using the content classification model that has been obtained through training, if it is found that accuracy of the model is low, the third device triggers the first device to retrain the content classification model with reference to related data, and updates the content classification model on the third device after the new content classification model is obtained through training. This manner of iteratively updating the content classification model can meet differentiated requirements of different users, different networks, and different scenarios, and has better generalization performance and commonality.

According to a seventh aspect, an embodiment of this application provides a computer-readable storage medium. The computer-readable storage medium stores a computer program; and when the computer program is run on a processor, the method according to any one of the first aspect or the possible implementations of the first aspect is implemented.

According to an eighth aspect, an embodiment of this application provides a computer-readable storage medium. The computer-readable storage medium stores a computer program; and when the computer program is run on a processor, the method according to any one of the second aspect or the possible implementations of the second aspect is implemented.

According to a ninth aspect, an embodiment of this application provides a computer program product, where the computer program product is stored in a memory; and when the computer program product runs on a processor, the method according to any one of the first aspect or the possible implementations of the first aspect is implemented.

According to a tenth aspect, an embodiment of this application provides a computer program product, where the computer program product is stored in a memory; and when the computer program product runs on a processor, the method according to any one of the second aspect or the possible implementations of the second aspect is implemented.

According to an eleventh aspect, an embodiment of this application provides a data stream classification model updating system, including a third device and a first device.

The third device is the data stream classification model updating device according to any one of the third aspect or the possible implementations of the third aspect, or is the data stream classification model updating apparatus according to any one of the fifth aspect or the possible implementations of the fifth aspect.

The first device is the data stream classification model updating device according to any one of the fourth aspect or the possible implementations of the fourth aspect, or is the data stream classification model updating apparatus according to any one of the sixth aspect or the possible implementations of the sixth aspect.

In embodiments of this application, after the first data stream class is classified based on the behavior classification model, and the second data stream class is classified based on the preset correspondence about the common feature, if the first data stream class is different from the second data stream class, the correction data, namely, the training sample, for updating the behavior classification model is generated. The correction data is autonomously obtained by the device when the first data stream class corresponding to the current data stream is different from the second data stream class corresponding to the current data stream, and no manual labeling is required. Therefore, the efficiency of obtaining the sample data for training the behavior classification model is higher. In addition, the correction data includes the packet information and the accurate data stream class that are generated when the classification result of the behavior classification model is inaccurate. Therefore, the behavior classification model is subsequently updated based on the correction data, to obtain the behavior classification model with a more accurate classification effect.

Furthermore, the first data stream class corresponding to the current data stream may be specifically obtained based on the content classification model and the behavior classification model, and then the first data stream class is corrected to obtain the final data stream class of the current data stream. The behavior classification model is pre-obtained through training based on the packet information and the data stream classes of the plurality of data stream samples, and the content classification model is obtained through training based on the feature information of the data stream and the data stream class classified by the behavior classification model. Therefore, the feature information, the packet information, and the like are analyzed by using the content classification model and the behavior classification model, so that the first data stream class corresponding to the current data stream can be more accurately predicted. In addition, because the data stream class that is in the data stream sample and that is used for training the content classification model is classified by the behavior classification model, there is no need to collect a large amount of data required for training, to avoid the insufficient data integrity.

Moreover, in a process in which the third device classifies a data stream class by using the behavior classification model that has been obtained through training, if it is found by using an address correction model (including the correspondence about the common feature) that a deviation occurs on a classification result, when deviations occur for a plurality of times in total, the first device or the third device retrains the behavior classification model with reference to related data causing the deviations, and the behavior classification model on the third device is updated after the new behavior classification model is obtained through training. The iteratively updated behavior classification model can meet differentiated requirements of different users, different networks, and different scenarios, and has better generalization performance and commonality.

Furthermore, in the process in which the third device classifies the data stream class by using the content classification model that has been obtained through training, if it is found, through comparison between the comprehensive confidence and a preset update threshold θ2, that update is required, when the update is required for a plurality of times in total, the second device or the third device retrains the content classification model with reference to related data that causes the comprehensive confidence to be lower than θ2, and the content classification model on the third device is updated after the new content classification model is obtained through training. The iteratively updated content classification model can meet differentiated requirements of different users, different networks, and different scenarios, and has better generalization performance and commonality.

BRIEF DESCRIPTION OF THE DRAWINGS

The following describes accompanying drawings used in embodiments of the present application.

FIG. 5 is a schematic diagram of an example of a data stream record according to an embodiment of the present application;

FIG. 6 is a schematic diagram of an example of a data stream record according to an embodiment of the present application;

FIG. 7 is a schematic diagram of a structure of a data stream classification model updating apparatus according to an embodiment of the present application;

FIG. 8 is a schematic diagram of a structure of another data stream classification model updating apparatus according to an embodiment of the present application;

DETAILED DESCRIPTION OF ILLUSTRATIVE EMBODIMENTS

The following describes embodiments of the present application with reference to accompanying drawings in embodiments of the present application.

Figure 1:
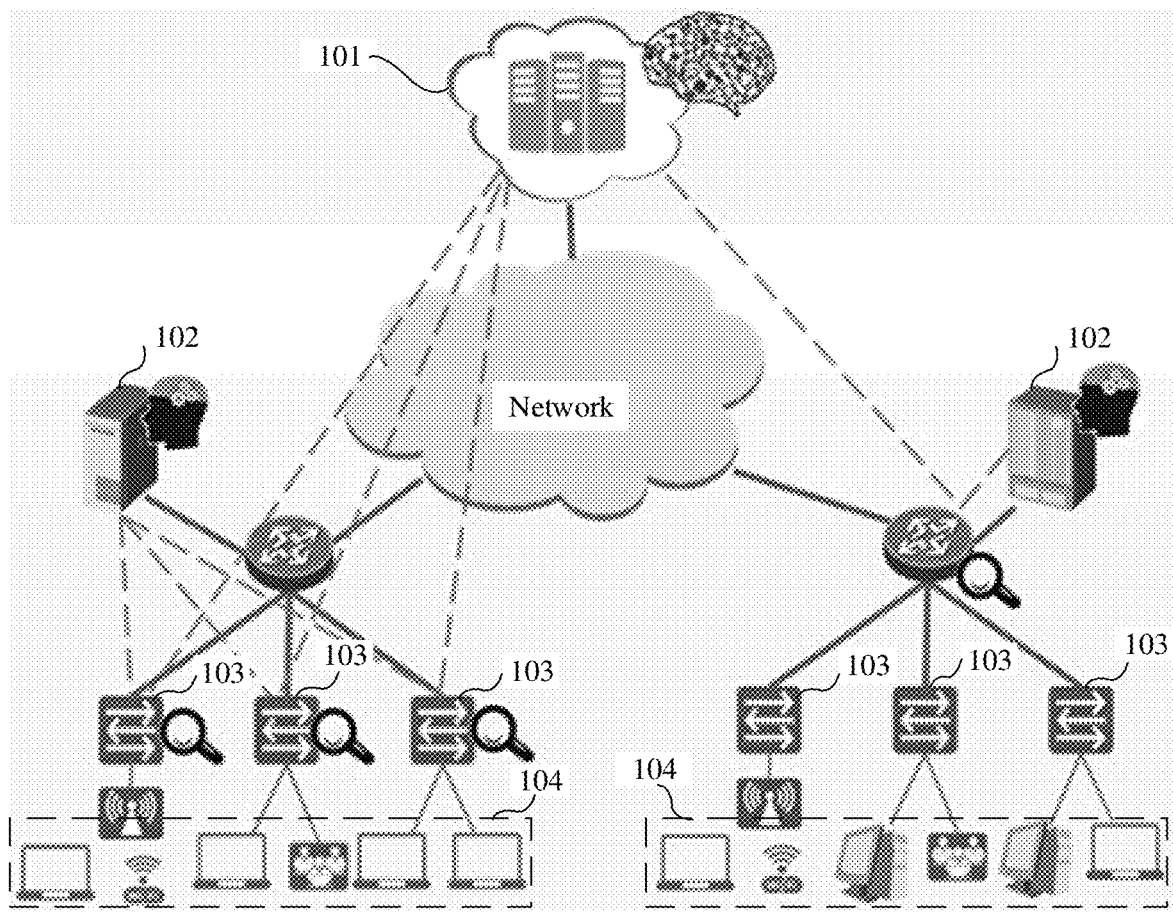
FIG. 1 is a schematic diagram of an architecture of a data stream classification model updating system according to an embodiment of the present application.

FIG. 1 is a schematic diagram of an architecture of a data stream classification model updating system according to an embodiment of the present application. The system includes a first device 101, a second device 102, a third device 103, and a terminal 104. These devices may be connected in a wired or wireless manner.

The terminal 104 is configured to run various applications such as a video conference application, a voice conference application, and a desktop cloud application. Different applications usually generate data streams of different data stream classes (also referred to as application types). In this embodiment of this application, a data stream generated by the terminal 104 needs to be sent to a destination device through the third device 103. The third device 103 may include a forwarding device, for example, a router or a switch. There may be one or more third devices 103. For example, there is one router and three switches. For another example, there is only one switch. For another example, there are three switches.

How the terminal 104 sends the data stream generated by the terminal 104 and how the third device 103 forwards the data stream may be implemented according to a traffic control policy generated by an operations support system (OSS). For example, when it is specified in the traffic control policy that a data stream generated by the video conference application has a highest priority, and if the terminal 104 or the third device 103 needs to send a plurality of data streams including the data stream generated by the video conference application, the data stream generated by the video conference application is preferentially sent. It should be noted that the traffic control policy is generated by the OSS based on a data stream class of a current data stream. In this embodiment of this application, the data stream class that is of the current data stream and that is used by the OSS to generate the traffic control policy may be determined by the third device 103.

Figure 2A:
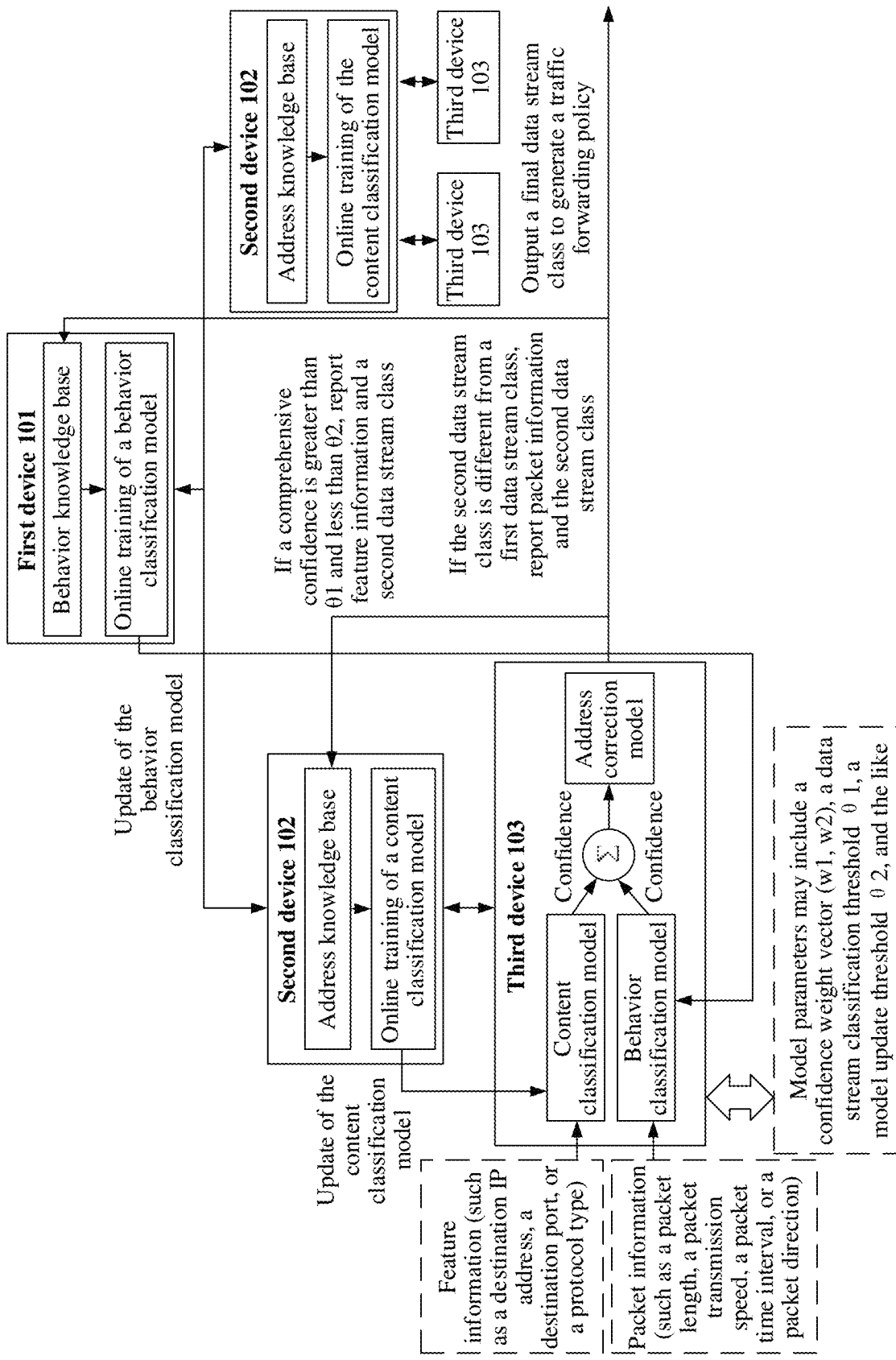
FIG. 2A is a schematic diagram of a scenario of a content classification model and a behavior classification model according to an embodiment of the present application.

As shown in FIG. 2A, the third device 103 needs to determine the data stream class of the current data stream by using a behavior classification model, a content classification model, and an address correction model. Model parameters may include but are not limited to a confidence weight vector (w1, w2), a first preset threshold θ1 and a second preset threshold θ2 of the data stream class, and the like. The first preset threshold θ1 may also be referred to as a classification threshold, and is used to measure whether to classify the data stream class into a specific type. The second preset threshold θ2 is also referred to as a model update threshold, and is used to measure when to update the content classification model. These model parameters are described in more detail in the following method procedures. Inputs used by the content classification model to classify the data stream class of the current data stream may include feature information (such as a destination IP address, a destination port, or a protocol type). Inputs used by the behavior classification model to classify the data stream class of the current data stream may include packet information (such as a packet length, a packet transmission speed, a packet time interval, or a packet direction). The third device 103 obtains a first data stream class based on a confidence obtained by using the content classification model, a confidence obtained by using the behavior classification model, and the confidence weight vector (w1, w2). In addition, the third device 103 further predicts a second data stream class of the current data stream by using the address correction model. If the second data stream class of the current data stream can be predicted, the second data stream class is used as a final data stream class of the current data stream. If the second data stream class of the current data stream is not predicted, the first data stream class is used as a final data stream class of the current data stream.

In this embodiment of this application, the behavior classification model and the content classification model are updated on an appropriate occasion. For the behavior classification model, the third device 103 may perform training based on a corresponding data sample (or training data) to update the behavior classification model; or the first device 101 may perform training based on a corresponding data sample to obtain a new model parameter, and then send the new model parameter to the third device 103, so that the third device 103 updates the behavior classification model. In addition, a condition for updating the behavior classification model may be: Inconsistency between a first data stream class of a data stream and a second data stream class of the data stream occurs for one or more times. For the content classification model, the third device 103 may perform training based on a corresponding data sample to update the content classification model; or the second device 102 may perform training based on a corresponding data sample to obtain a new model parameter, and then send the new model parameter to the third device 103, so that the third device 103 updates the content classification model. In addition, a condition for updating the content classification model may be: A confidence that the current data stream belongs to the first data stream class is determined to be higher than the first preset threshold θ1 but lower than the second preset threshold θ2.

Figure 2B:
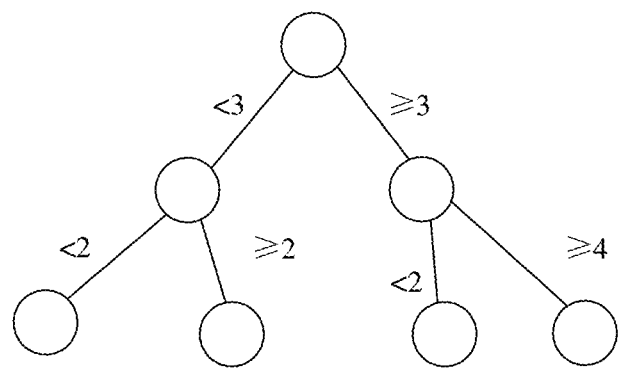
FIG. 2B is a schematic diagram of a structure of a classification model according to an embodiment of the present application.
Figure 2C:
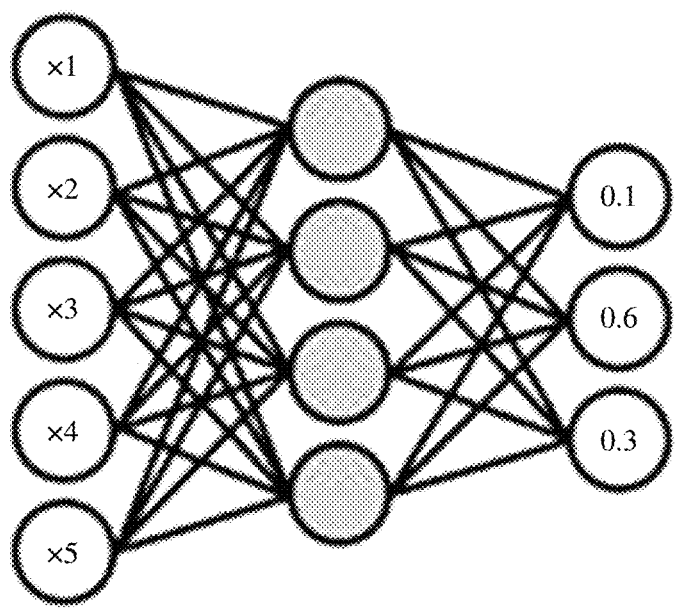
FIG. 2C is a schematic diagram of a structure of a classification model according to an embodiment of the present application.
Figure 2D:
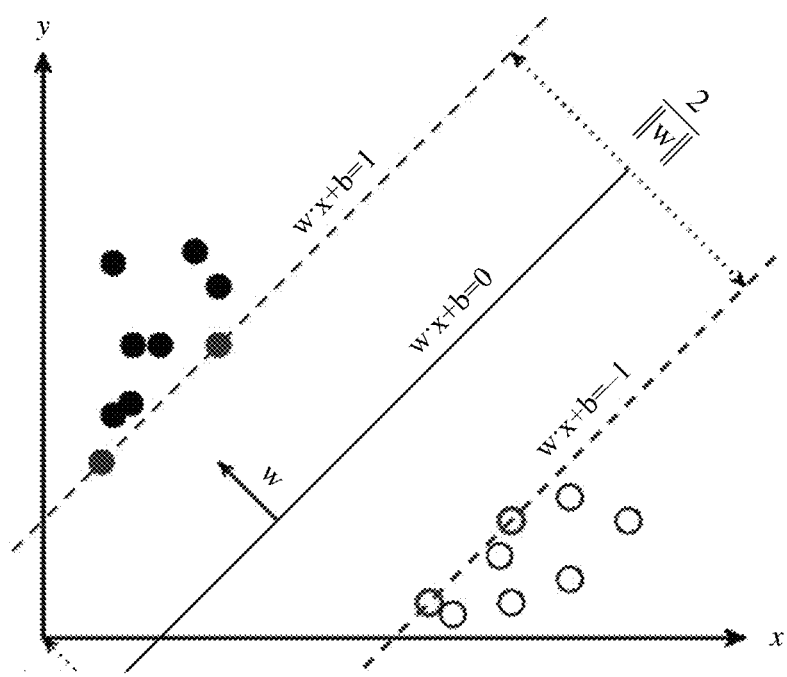
FIG. 2D is a schematic diagram of a structure of a classification model according to an embodiment of the present application.

It should be noted that the content classification model is essentially a classification model. As shown in FIG. 2B, a classification model may be a tree model. As shown in FIG. 2C, a classification model may be a neural network model. As shown in FIG. 2D, a classification model may be a support vector machine (SVM) model. Certainly, the classification model may alternatively be a model in another form. Optionally, the content classification model implements classification by extracting features of input vectors (for example, feature information such as the destination Internet Protocol (IP) address, a destination port number, and the protocol type). Therefore, the content classification model may classify that data streams with a same destination IP address, a same protocol type, and a same port number belong to a same data stream class, that data streams with a same network segment, a same protocol type, and similar port numbers belong to a same data stream class, and that transmission control protocol (TCP) traffic with a destination port number 20 (a well-known file transfer protocol (FTP) port number) belongs to a data stream class of download.

It should be noted that the first device 101 in the architecture shown in FIG. 1 may be a server or a server cluster, and may be deployed locally, remotely, or on a cloud. The second device 102 may be a server or a server cluster including a plurality of servers. A plurality of second devices 102 are connected to the first device 101 through a network. A second device 102 and one or more third devices 103 connected to the second device 102 belong to a network, and another second device 102 and one or more third devices 103 connected to the another second device 102 belong to another network. In embodiments of this application, networks may be classified based on geographical locations. For example, two networks at different geographical locations are two different networks. Networks may be classified based on network forms. For example, a cellular network, a Wi-Fi network, and a wired network are three different networks. For another example, two different local area networks are two different networks. Certainly, there may be other classification manners. Through such deployment, when obtaining, for any third device 103 through training, a parameter for model update, the first device 101 may use training data provided by a third device 103 in another network.

Optionally, the architecture shown in FIG. 1 may be considered as a three-layer architecture.

The first device 101 is at a highest layer of the three layers. By comparison, the first device 101 has a largest storage amount and a strongest computing capability. Therefore, massive data (for example, data stream classes and packet information) required for training the behavior classification model is stored in the first device 101, for example, stored in a behavior knowledge base in the first device 101. Moreover, calculation of the massive data is also completed by the first device 101. In addition, because the data stream classes, the packet information, and the like that are submitted by the third device 103 to the first device 101 are basically desensitized, processing by the first device 101 does not cause a security problem.

The second device 102 is at an intermediate layer of the three layers. By comparison, the second device 102 has a moderate storage capability and a moderate computing capability, and can store a specific quantity of feature information (such as an IP address and the TCP protocol) and data stream classes in, for example, an address knowledge base in the second device 102. Because the second device 102 is located in a local area network to which the third device 103 belongs, information such as the IP address remains in the local area network, and there is no risk of security and privacy when the information is stored in the second device 102. Furthermore, because the second device 102 is close to the third device 103, an update requirement for the content classification model may be fed back to the second device 102 in time, thereby facilitating frequent update of the content classification model.

The third device 103 is at a lowest layer of the three layers, and usually has a main function of data packet forwarding. Therefore, the third device 103 may not train the content classification model or the behavior classification model, and not store sample data required for training.

In a possible implementation, joint deployment of a plurality of networks may not be applied. In this case, there may be one second device 102 connected to the first device 101. That is, when obtaining, for any third device 103 through training, a parameter for model update, the first device 101 uses training data provided by another third device 103 only in a network to which the third device 103 belongs, and does not use training data provided by a device in another network. For this case, the architecture may be further changed. For example, the first device 101 is removed, and an operation and a corresponding function that are performed by the first device 101 and that are described above and below are integrated into the second device 102, in other words, the operation and the function originally performed by the first device 101 are all locally implemented.

In another possible implementation, the foregoing operations of predicting the data stream class of the current data stream based on the corresponding models and updating the model may be performed by the third device 103, or may be performed by another device, for example, the second device 102, the first device 101, or the OSS. When the second device 102, the first device 101, or the OSS performs the operations, subjects for performing these operations in the following method embodiments are changed to the second device 102, the first device 101, or the OSS. In addition, simple logical reasoning may be further carried out on some technical descriptions. For example, if the third device 103 originally needs to receive, when performing update, first information sent by the first device 101, when the first device 101 replaces the third device 103 to perform update, the first device 101 may directly use the first information, and another device does not need to send the first information to the first device 101.

Figure 3:
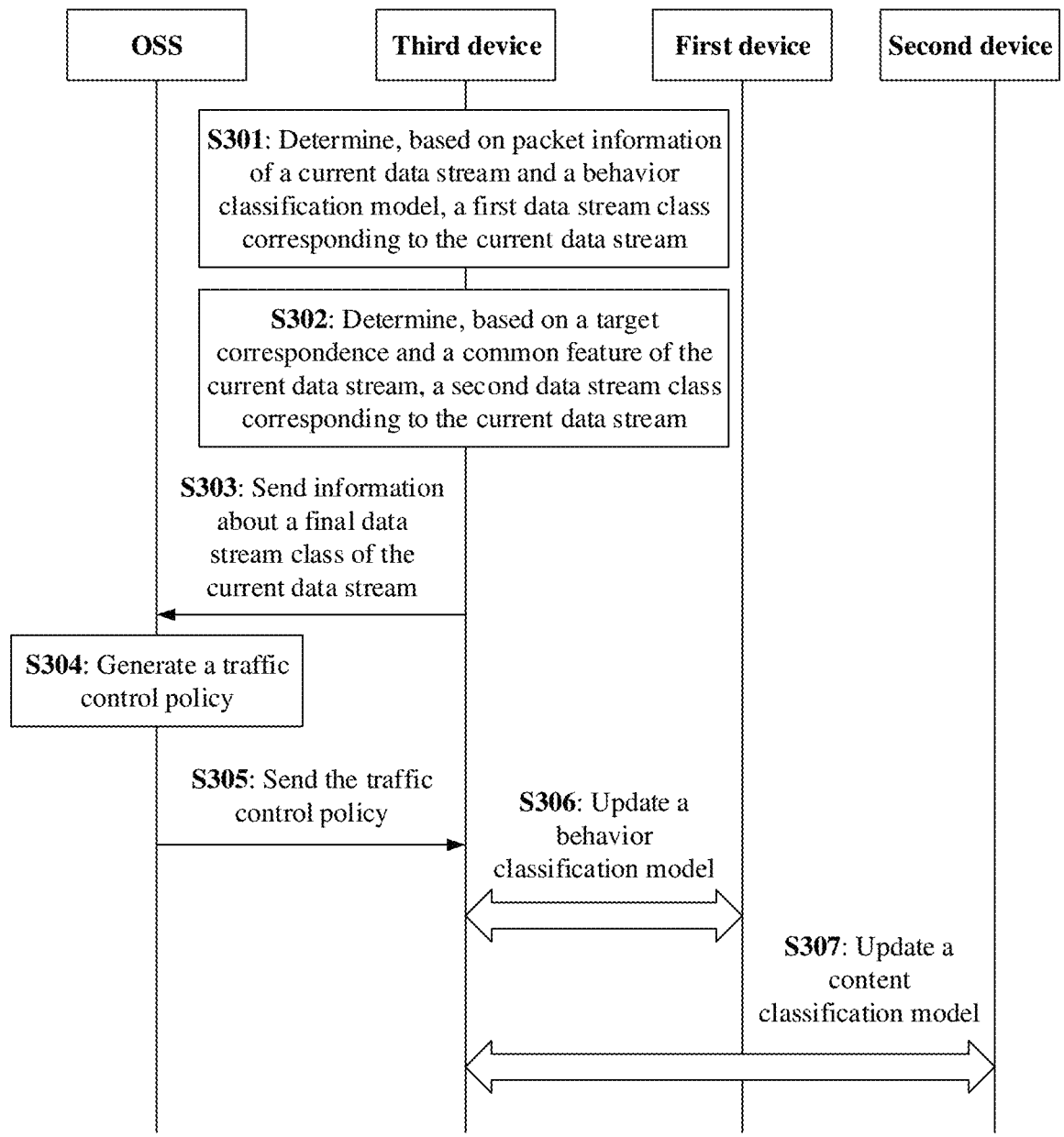
FIG. 3 is a schematic flowchart of a data stream classification model updating method according to an embodiment of the present application.

FIG. 3 shows a data stream classification model updating method according to an embodiment of the present application. The method may be implemented based on the architecture shown in FIG. 1, and includes, but is not limited to, the following steps.

Step S301: The third device determines, based on packet information of a current data stream and a behavior classification model, a first data stream class corresponding to the current data stream. The following enumerates several optional solutions.

Optional solution 1: The third device determines, by using only the packet information of the current data stream and the behavior classification model, the first data stream class corresponding to the current data stream. A specific implementation is as follows:

The behavior classification model is a model obtained based on packet information and data stream classes of a plurality of data stream samples. Optionally, the plurality of data stream samples may be offline samples, in other words, the behavior classification model may be an offline trained model. The plurality of data stream samples may alternatively be typical (namely, representative) samples selected in advance. For example, packet lengths of packets in a data stream of a video conference application are long in most cases, but sometimes are short. By comparison, long packet lengths can better reflect the fact that the current data stream is a data stream of the video conference application. Therefore, representative data streams with long packet lengths are preferentially selected as data stream samples of the data stream of the video conference application. Optionally, the data stream classes of the plurality of data stream samples may be manually determined, in other words, manually labeled. Because the behavior classification model is the model obtained based on the packet information and the data stream classes of the plurality of data stream samples, the behavior classification model can reflect some relationships between packet information and a data stream class of a data stream. Therefore, when the packet information of the current data stream is input into the behavior classification model, a tendency (or probability) that the current data stream belongs to a specific data stream class or some specific data stream classes can be predicted by using the behavior classification model to some extent, and a parameter that reflects the tendency (or probability) may also be referred to as a confidence.

In this embodiment of this application, the packet information may include one or more of a packet length, a packet transmission speed, a packet time interval, and a packet direction. Optionally, the packet length includes one or more of an Ethernet frame length, an IP packet length, a transmission protocol packet length, and a header length in a packet. A transmission protocol includes the transmission control protocol TCP and/or the user datagram protocol UDP. Certainly, in addition to including the features enumerated herein, the packet information may further include another feature, for example, a largest value, a smallest value, an average value, a variance, or a quantile of the packet length, the packet transmission speed, the packet time interval, and the packet direction. The packet information may be input in a vector form into the behavior classification model, for example, input in a form of (the packet length, the packet transmission speed, the packet time interval). In addition, the data stream class in embodiments of this application may also be referred to as an application type.

In a first possible case of this embodiment of this application, a confidence that the current data stream belongs to each of N possible data stream classes may be estimated (or predicted), that is, N first confidences of the current data stream that correspond to the N data stream classes are obtained, where N is greater than or equal to 1. For example, if the N data stream classes are a data stream class of the video conference, a data stream class of voice conference, and a data stream class of desktop cloud, a first confidence that the current data stream belongs to the data stream class of the video conference, a first confidence that the current data stream belongs to the data stream class of the voice conference, and a first confidence that the current data stream belongs to the data stream class of the desktop cloud need to be estimated by using the behavior classification model. If the N data stream classes are a data stream class of the video conference, a first confidence that the current data stream belongs to the data stream class of the video conference needs to be estimated by using the behavior classification model.

After first confidences of the current data stream that correspond to some data stream classes are determined, a data stream class may be selected, based on the first confidences corresponding to these data stream classes, as the first data stream class corresponding to the current data stream. For example, a data stream class corresponding to a highest confidence is used as the first data stream class corresponding to the current data stream. Certainly, another factor may be comprehensively considered for selection.

Optional solution 2: The third device determines, by using not only the packet information of the current data stream and the behavior classification model but also feature information and a content classification model, the first data stream class corresponding to the current data stream. The solution specifically includes the following several parts:

First part: The third device obtains, based on the packet information of the current data stream and the behavior classification model, at least one first confidence that is of the current data stream and that corresponds to at least one data stream class.

The behavior classification model is a model obtained based on packet information and data stream classes of a plurality of data stream samples. Optionally, the plurality of data stream samples may be offline samples, in other words, the behavior classification model may be an offline trained model. The plurality of data stream samples may alternatively be typical (namely, representative) samples selected in advance. For example, packet lengths of packets in a data stream of a video conference application are long in most cases, but sometimes are short. By comparison, long packet lengths can better reflect the fact that the current data stream is a data stream of the video conference application. Therefore, representative data streams with long packet lengths are preferentially selected as data stream samples of the data stream of the video conference application. Optionally, the data stream classes of the plurality of data stream samples may be manually determined, in other words, manually labeled. Because the behavior classification model is the model obtained based on the packet information and the data stream classes of the plurality of data stream samples, the behavior classification model can reflect some relationships between packet information and a data stream class of a data stream. Therefore, when the packet information of the current data stream is input into the behavior classification model, a tendency (or probability) that the current data stream belongs to a specific data stream class or some specific data stream classes can be predicted by using the behavior classification model to some extent, and a parameter that reflects the tendency (or probability) may also be referred to as a confidence.

In this embodiment of this application, the packet information may include one or more of a packet length, a packet transmission speed, a packet time interval, and a packet direction. Optionally, the packet length includes one or more of an Ethernet frame length, an IP packet length, a transmission protocol packet length, and a header length in a packet. A transmission protocol includes the transmission control protocol TCP and/or the user datagram protocol UDP. Certainly, in addition to including the features enumerated herein, the packet information may further include another feature, for example, a largest value, a smallest value, an average value, a variance, or a quantile of the packet length, the packet transmission speed, the packet time interval, and the packet direction. The packet information may be input in a vector form into the behavior classification model, for example, input in a form of (the packet length, the packet transmission speed, the packet time interval). In addition, the data stream class in embodiments of this application may also be referred to as an application type.

In a first possible case of this embodiment of this application, a confidence that the current data stream belongs to each of N possible data stream classes may be estimated (or predicted), that is, N first confidences of the current data stream that correspond to the N data stream classes are obtained, where N is greater than or equal to 1. For example, if the N data stream classes are a data stream class of the video conference, a data stream class of voice conference, and a data stream class of desktop cloud, a first confidence that the current data stream belongs to the data stream class of the video conference, a first confidence that the current data stream belongs to the data stream class of the voice conference, and a first confidence that the current data stream belongs to the data stream class of the desktop cloud need to be estimated by using the behavior classification model. If the N data stream classes are a data stream class of the video conference, a first confidence that the current data stream belongs to the data stream class of the video conference needs to be estimated by using the behavior classification model.

In a second possible case of this embodiment of this application, only a confidence that the current data stream belongs to a data stream class on which this embodiment of this application focuses in a plurality of possible data stream classes is estimated (or predicted), that is, one first confidence that is of the current data stream and that corresponds to one data stream class is obtained. For example, if the plurality of data stream classes are a data stream class of the video conference, a data stream class of voice conference, and a data stream class of desktop cloud, but this embodiment of this application focuses on only the data stream class of the video conference, only a first confidence that the current data stream belongs to the data stream class of the video conference needs to be estimated by using the behavior classification model.

Second part: The third device obtains, based on the feature information of the current data stream and the content classification model, at least one second confidence that is of the current data stream and that corresponds to the at least one data stream class.

Specifically, the content classification model is a model obtained based on feature information and one or more data stream class of one or more historical data streams. Optionally, the one or more historical data streams may be online data streams, namely, one or more data streams continuously generated in a previous time period, and the data stream class of the historical data stream is classified by the behavior classification model, in other words, the content classification model may be an online trained model. Because the content classification model is the model obtained based on the feature information and the data stream class of the one or more historical data streams, the content classification model can reflect some relationships between feature information and a data stream class of a data stream. Therefore, when the feature information of the current data stream is input into the content classification model, a tendency (or probability) that the current data stream belongs to a specific data stream class or some specific data stream classes can be predicted by using the content classification model to some extent, and a parameter that reflects the tendency (or probability) may also be referred to as a confidence.

In this embodiment of this application, the feature information may include one or more of a destination address, a protocol type, and a port number. The destination address may be an IP address, a destination MAC address, or an address in another form. Certainly, the feature information may further include another feature in addition to the features enumerated herein. Further, the feature information herein may be target-specific information, for example, a target IP address or a target port. The feature information may be input in a vector form into the content classification model, and may be in a form of (ip, port, protocol) such as (10.29.74.5, 8443, 6), or may be in a form of (mac, port, protocol) such as (05FA1525EEFF, 8443, 6). Certainly, the feature information may alternatively be in another form, and examples are not enumerated herein one by one.

In the first possible case of this embodiment of this application, a confidence that the current data stream belongs to each of the N possible data stream classes may be estimated (or predicted), that is, N second confidences of the current data stream that correspond to the N data stream classes are obtained. For example, if the N data stream classes are the data stream class of the video conference, the data stream class of the voice conference, and the data stream class of the desktop cloud, a second confidence that the current data stream belongs to the data stream class of the video conference, a second confidence that the current data stream belongs to the data stream class of the voice conference, and a second confidence that the current data stream belongs to the data stream class of the desktop cloud need to be estimated by using the content classification model. If the N data stream classes are the data stream class of the video conference, a second confidence that the current data stream belongs to the data stream class of the video conference needs to be estimated by using the content classification model.

In the second possible case of this embodiment of this application, only a confidence that the current data stream belongs to the data stream class on which this embodiment of this application focuses in the plurality of possible data stream classes is estimated (or predicted), that is, one second confidence that is of the current data stream and that corresponds to one data stream class is obtained. For example, if the plurality of data stream classes are the data stream class of the video conference, the data stream class of the voice conference, and the data stream class of the desktop cloud, but this embodiment of this application focuses on only the data stream class of the video conference, only a second confidence that the current data stream belongs to the data stream class of the video conference needs to be estimated by using the content classification model.

Third part: The third device determines the first data stream class of the current data stream based on the at least one first confidence and the at least one second confidence.

Specifically, because the at least one first confidence can represent the data type tendency of the current data stream to some extent, and the at least one second confidence can also represent the data type tendency of the current data stream to some extent, a more accurate and reliable data stream class tendency can be obtained in comprehensive consideration of the at least one first confidence and the at least one second confidence, to obtain the data stream class of the current data stream. For ease of description below, the data stream class determined in this manner is referred to as the first data stream class.

In an optional solution, a data stream class corresponding to a largest obtained comprehensive confidence is determined as the data stream class of the current data stream, in other words, is determined as the first data stream class corresponding to the current data stream. For example, a comprehensive confidence corresponding to the data stream class of the video conference is determined as 0.7 based on the first confidence corresponding to the data stream class of the video conference and the second confidence corresponding to the data stream class of the video conference; a comprehensive confidence corresponding to the data stream class of the voice conference is determined as 0.2 based on the first confidence corresponding to the data stream class of the voice conference and the second confidence corresponding to the data stream class of the voice conference; a comprehensive confidence corresponding to the data stream class of the desktop cloud is determined as 0.1 based on the first confidence corresponding to the data stream class of the desktop cloud and the second confidence corresponding to the data stream class of the desktop cloud. Because the comprehensive confidence corresponding to the data stream class of the video conference is the largest, the predicted (also expressed as "estimated") data stream class of the current data stream is the data stream class of the video conference, in other words, the data stream class of the video conference is the first data stream class corresponding to the current data stream.

In another optional solution, the determining, based on the at least one first confidence and the at least one second confidence, the first data stream class corresponding to the current data stream may be specifically: calculating, based on the first confidence corresponding to a target data stream class, a weight value of the first confidence, the second confidence corresponding to the target data stream class, and a weight value of the second confidence, a comprehensive confidence corresponding to the target data stream class. The target data stream class is any one of the at least one data stream class, in other words, each of the at least one data stream class conforms to a feature of the target data stream class herein. If the comprehensive confidence corresponding to the target data stream class is greater than a first preset threshold, it is determined that the data stream class of the current data stream is the target data stream class. In this case, the target data stream class may be used as the first data stream class corresponding to the current data stream. For example, if a comprehensive confidence corresponding to the data stream class of the video conference is greater than the first preset threshold, it is determined that the data stream class of the video conference is the first data stream class corresponding to the current data stream. If a comprehensive confidence corresponding to the data stream class of the desktop cloud is greater than the first preset threshold, it is determined that the data stream class of the desktop cloud is the first data stream class corresponding to the current data stream.

For example, it is assumed that a confidence weight vector (w1, w2) is (0.4, 0.6), that is, the weight of the first confidence (which may also be considered as a weight of the behavior classification model) is 0.6, and the weight of the second confidence (which may also be considered as a weight of the content classification model) is 0.4, and the first preset threshold θ1 of the data stream class is equal to 0.5. At the beginning of performing data stream classification by the third device, because the content classification model is not fully trained, the behavior classification model can classify a data stream class of an input data stream, but the content classification model cannot classify a data stream class of input stream data. Therefore, at the beginning, a confidence corresponding to any data stream class classified by the content classification model is 0.

Figure 4:
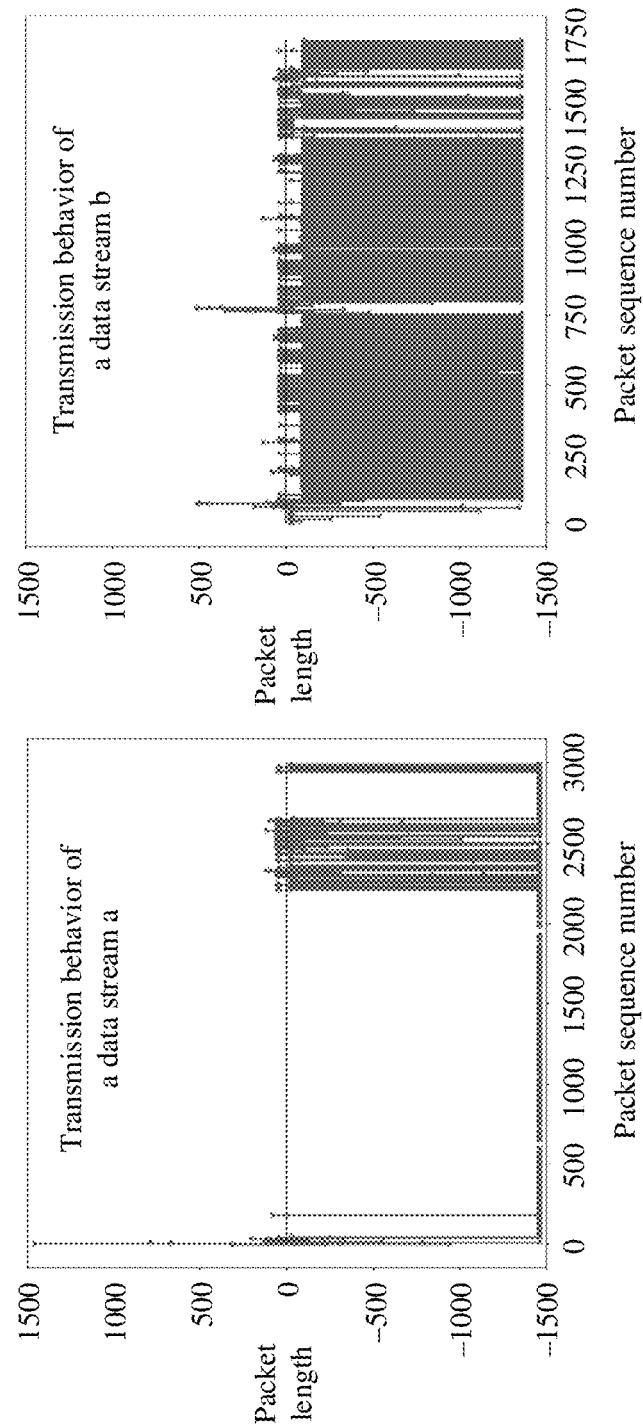
FIG. 4 is a schematic diagram of a scenario of a data stream a and a data stream b according to an embodiment of the present application.

It is assumed that there are two desktop cloud data streams. As shown in FIG. 4, a horizontal axis represents a data stream sequence number, a vertical axis represents a packet length, a packet whose packet length is greater than 0 is an uplink packet, a packet whose packet length is less than 0 is a downlink packet, and both a data stream a and a data stream b belong to the data stream class of the desktop cloud. The data stream b includes an uplink packet, and can better represent a feature in a desktop cloud scenario. Therefore, it is considered that a packet behavior of the data stream b is a typical behavior. There is no uplink packet in the data stream a for a long time period, and it cannot clearly indicate that the data stream a is in the desktop cloud scenario. Therefore, it is considered that a packet behavior of the data stream a is an atypical behavior. The behavior classification model is usually obtained through training based on data streams with typical behaviors. Therefore, the behavior classification model can classify the data stream class of the data stream b, but cannot classify the data stream class of the data stream a. Feature information of the data stream a and the data stream b is as follows:

A protocol type of the data stream a is the TCP, a destination IP address of the data stream a is 10.129.74.5, and a destination port number of the data stream a is 8443.

A protocol type of the data stream b is the TCP, a destination IP address of the data stream b is 10.129.56.39, and a destination port number of the data stream b is 443.

In this case, for the data stream a, second confidences of classifying, by the content classification model, that the data stream a belongs to the data stream class of the desktop cloud, the data stream class of the voice conference, and the data stream class of the video conference are all 0; and first confidences of classifying, by the behavior classification model based on packet information, that the data stream a belongs to the data stream class of the desktop cloud, the data stream class of the voice conference, and the data stream class of the video conference are respectively 0.5, 0, and 0. Therefore, comprehensive confidences corresponding to the three data stream classes are as follows:

Desktop cloud: 0x0.4+0.5x0.6=0.3, which is less than θ1. Therefore, the current data stream does not belong to the data stream class of the desktop cloud, that is, in this case, a calculated first data stream class corresponding to the current data stream a is not the data stream class of the desktop cloud.

Voice conference: 0x0.4+0x0.6=0, which is less than θ1. Therefore, the current data stream does not belong to the data stream class of the voice conference.

Video conference: 0x0.4+0x0.6=0, which is less than θ1. Therefore, the current data stream does not belong to the data stream class of the video conference.

In this case, for the data stream b, second confidences of classifying, by the content classification model, that the data stream b belongs to the data stream class of the desktop cloud, the data stream class of the voice conference, and the data stream class of the video conference are all 0; and first confidences of classifying, by the behavior classification model based on packet information, that the data stream b belongs to the data stream class of the desktop cloud, the data stream class of the voice conference, and the data stream class of the video conference are respectively 0.9, 0, and 0. Therefore, comprehensive confidences corresponding to the three data stream classes are as follows:

Desktop cloud: 0x0.4+0.9x0.6=0.54, which is greater than θ1. Therefore, the current data stream belongs to the data stream class of the desktop cloud, that is, in this case, a calculated first data stream class corresponding to the current data stream b is the data stream class of the desktop cloud.

Voice conference: 0x0.4+0x0.6=0, which is less than θ1. Therefore, the current data stream does not belong to the data stream class of the voice conference.

Video conference: 0x0.4+0x0.6=0, which is less than θ1. Therefore, the current data stream does not belong to the data stream class of the video conference.

Step S302: The third device determines, based on a target correspondence and a common feature of the current data stream, a second data stream class corresponding to the current data stream, where the target correspondence is a correspondence between a plurality of common features and a plurality of data stream classes.

Specifically, if a person skilled in the art can basically determine a data stream class of a data stream accurately after finding some features of the data stream, the features are the common features herein. For example, the common feature may be a well-known port number, a well-known DNS, or the like. Using the well-known port number as an example, a port 20 is an FTP port, and the FTP port is usually used for download (Download). Therefore, the port 20 corresponds to a data stream class of data download. In this example, a correspondence between the port 20 and the data stream class of data download may be established. Using the well-known DNS as an example, a DNS address with a domain name www.163.com is 183.131.119.86, and the domain name www.163.com is a well-known web page website, and corresponds to a data stream class of web page. Therefore, a correspondence between the address 183.131.119.86 and the data stream class of web page may be established. Based on the two examples provided herein, the target correspondence may be as shown in Table 1:

TABLE 1

| Common feature | | | |
| --- | --- | --- | --- |
| IP address | Port | Protocol (optional) | Data stream class |
| — | 20 | TCP | Data download (Download) |
| — | 21 | TCP | Data download (Download) |
| 183.131.119.86 | 80 | TCP | Web page (Web) |

Refer to Table 1. If the current data stream includes the "port 20", the third device may determine the corresponding "data stream class of data download" based on the target correspondence and the common feature "port 20" in the current data stream. Therefore, the "data stream class of data download" is the determined second data stream class corresponding to the current data stream.

Optionally, the third device may have an address correction library (certainly, which may also have another name), and information in the target correspondence may be stored in the address correction library, so that the third device uses the information when determining the second data stream class corresponding to the current data stream. In addition, content in the target correspondence may be classified by a machine, or may be manually added. The content in the target correspondence may be further updated at an appropriate occasion as required.

It should be noted that each common feature in the target correspondence corresponds to a unique data stream class. Therefore, a plurality of common features may correspond to a same data stream class (in other words, in a many-to-one correspondence), or a plurality of common features may respectively correspond to different data stream classes (in other words, in a one-to-one correspondence).

It should be noted that not all data streams include the foregoing common feature, and therefore, a second data stream class may be obtained not for all the data streams.

Step S303: The third device sends a final data stream class of the current data stream to the operations support system OSS.

Specifically, when the second data stream class corresponding to the current data stream is classified, the second data stream class corresponding to the current data stream is used as the final data stream class of the current data stream; when the second data stream class corresponding to the current data stream is not classified, the first data stream class corresponding to the current data stream is used as the final data stream class of the current data stream. Optionally, the first data stream class corresponding to the current data stream may alternatively be directly used as the final data stream class of the current data stream.

In addition, the third device may send the final data stream class of the current data stream to the OSS each time the third device determines the final data stream class of the current data stream. For example, when a final data stream class of the data stream a is generated for the first time, the final data stream class of the data stream a is sent to the OSS. When a final data stream class of the data stream b is generated for the first time, the final data stream class of the data stream b is sent to the OSS. When a final data stream class of the data stream a is generated for the second time, the final data stream class of the data stream a is sent to the OSS. When a final data stream class of the data stream b is generated for the second time, the final data stream class of the data stream b is sent to the OSS. When a final data stream class of a data stream c is generated, the final data stream class of the data stream c is sent to the OSS. It may be understood that, if the third device is the OSS, there is no need to perform the operation of sending the final data stream class of the current data stream to the OSS.

Step S304: The OSS generates a traffic control policy for the current data stream based on the final data stream class of the current data stream. For example, if the final data stream class of the current data stream indicates that the current data stream belongs to the data stream class of the desktop cloud or the data stream class of the video conference, the current data stream is defined as a data stream with high-priority QoS.

Step S305: The OSS sends the traffic control policy to the third device or the terminal.

Specifically, if the third device or the terminal learns, according to the traffic control policy, that the current data stream has the high-priority QoS, when finding that a plurality of types of data streams are to be sent, the third device or the terminal preferentially sends the current data stream configured with the high-priority.

In this embodiment of this application, the behavior classification model and the content classification model may be updated. An updated behavior classification model and an updated content classification model are used by the third device or another device to classify a data stream class of a new data stream.

For a process of updating the behavior classification model, refer to step S306:

Step S306: The third device updates the behavior classification model based on the first data stream class corresponding to the current data stream and the second data stream class corresponding to the current data stream. The following enumerates two different update solutions.

Solution 1:

First, if the first data stream class corresponding to the current data stream is different from the second data stream class corresponding to the current data stream, the third device sends correction data corresponding to the current data stream to the first device, where the correction data corresponding to the current data stream includes the packet information of the current data stream and the second data stream class corresponding to the current data stream.

Correspondingly, the first device receives the correction data that corresponds to the current data stream and that is sent by the third device. The first device determines whether correction data corresponding to a total of M data streams has been received from the third device. If the correction data corresponding to the total of M data streams has been received, the behavior classification model is trained based on the correction data corresponding to the M data streams to obtain a new behavior classification model.

In this embodiment of this application, the M data streams are an amount accumulated from a moment at which the behavior classification model becomes valid to a current moment (where if the model is updated, accumulation needs to be restarted). Alternatively, the M data streams are an amount accumulated within a preset time period (for example, within the latest 24 hours). Alternatively, a proportion of M in a total quantity of data streams that are transmitted after the behavior classification model becomes valid exceeds a preset threshold. For example, the preset threshold is preconfigured as 10%. If the total quantity of data streams that are transmitted after the behavior classification model becomes valid is represented by S, M=S*10%. For example, if S=10000, M=100; if S=89500, M=8950. For example, if a moment at which the behavior classification model becomes valid is 00:00:00 on Mar. 1, 2019, there are a total of 10,000 pieces of training data from the moment to the current moment, and a floating proportion (namely, the preset threshold) is 10%, and if correction data corresponding to a total of 1000 data streams is newly added since the validation moment, a new behavior classification model needs to be obtained through training. In this embodiment of this application, the M data streams include the current data stream.

The correction data corresponding to the M data streams may be represented in many forms. Using a data stream A in the M data streams as an example for description, correction data corresponding to the data stream A may be represented by {second data stream class corresponding to the data stream A, s triplets <packet direction, packet length, packet moment>}, where s is a positive integer. For example, if the second data stream class corresponding to the data stream A is the data stream class of the desktop cloud, and corresponds to three triplets <packet direction, packet length, packet moment>, the correction data corresponding to the data stream A may be represented by {data stream class of the desktop cloud, three triplets <packet direction, packet length, packet moment>}. Table 2 lists a possible case of the correction data in more detail.

TABLE 2

| Application type | Source | Packet direction | Packet length | Packet moment |
| --- | --- | --- | --- | --- |
| Data stream class of desktop cloud | First network | 1 | 76 | 0 |
| | | 0 | 467 | 0.32 |
| | | 0 | 40 | 0.38 |

Optionally, in Table 2, the "source" refers to an area from which behavior data of a data stream comes. The "source" may be filled with a name of a corresponding network; or may be filled with a name of a third device from which the behavior data comes, where the first device that receives the correction data then maps the name of the third device to a corresponding network based on a network topology. The "packet direction" may be represented by a value, where 0 indicates downlink, and 1 indicates uplink; or may be directly represented by "uplink" or "downlink". The "packet moment" may be a timestamp; or may be a relative moment, to be specific, the first record of each data stream is 0, and a subsequent record of the data stream is a moment from the first record.

In this embodiment of this application, the behavior classification model used by the third device also exists in the first device. Therefore, the first device trains the behavior classification model by using the correction data corresponding to the M data streams as training data, to obtain the new behavior classification model. Alternatively, the first device performs training by using the correction data corresponding to the M data streams as training data and with reference to batch training data that is historically stored, to obtain the new behavior classification model. Optionally, in a training process, packet information <packet direction, packet length, packet moment> in correction data of a data stream may be input into the behavior classification model by using a loss function, so that a data stream class that is output by the behavior classification model approximates to a data stream class in the correction data as much as possible. After the training is performed based on the correction data corresponding to all the M data streams, the trained new behavior classification model may be obtained. After obtaining the new behavior classification model through training, the first device sends first model data to the third device, where the first model data is model data of the new behavior classification model, and is used to describe the new behavior classification model obtained by the first device by training the behavior classification model based on the packet information of the current data stream and the second data stream class corresponding to the current data stream. A behavior classification model includes a model structure (for example, a function form of the model) and a model parameter. The first model data is at least in the following several cases. Case 1: The first model data is a parameter value of the model parameter of the new behavior classification model. Case 2: The first model data is differential data of the new behavior classification model relative to the untrained behavior classification model, and is usually a difference between a parameter value of the model parameter of the new behavior classification model and a parameter value of the model parameter of the untrained behavior classification model. Optionally, for the case 1, the first model data may be specifically a matrix including parameter values of a plurality of parameters. For the case 2, the first model data (namely, the differential data) may be specifically a matrix including differences of a plurality of parameter values. For example, if a matrix including the parameter values of the model parameters of the untrained behavior classification model is [a1, b1, c1, d1], and a matrix including the parameter values of the model parameters of the new behavior classification model is [a2, b2, c2, d2], a matrix including differences of the four model parameters is [a2-a1, b2-b1, c2-c1, d2-d1]. Correspondingly, for the case 1, the first model data is [a1, b1, c1, d1]; for the case 2, the first model data (namely, the differential data) is [a2-a1, b2-b1, c2-c1, d2-d1]. Case 3: The first model data includes parameter values of the model structure and the model parameter that are of the new behavior classification model, namely, complete data of the new behavior classification model.

The first model data may be specifically a model file. Commonly, an AI model file of an open-source Keras library is an h5 file/a JSON file, and an AI model file of an open-source Sklearn library is a pkl/m file. These files are binary and are used to store the parameter value of the model structure and/or the parameter value of the model parameter. The h5 file is used to describe the parameter value of the model parameter, and the JSON file is used to describe the model structure. During specific implementation, the first model data in both the case 1 and the case 2 may be the h5 file, and the first model data in the case 3 may include the h5 file and the JSON file.

Then, the third device receives the first model data sent by the first device, and updates the behavior classification model based on the received first model data. If the first model data is the complete data of the new behavior classification model, the third device may directly load the first model data to generate the new behavior classification model to replace the current behavior classification model, and subsequently classify a data stream class by using the new behavior classification model. If the first model data is the parameter value of the model parameter of the new behavior classification model, the parameter value is substituted into the current behavior classification model to replace the old parameter value, to obtain the new behavior classification model. If the first model data is the differential data, the new parameter value is obtained based on the differential data and the parameter value of the model parameter of the current behavior classification model, to obtain the new behavior classification model.

Optionally, the training the behavior classification model based on the correction data corresponding to the M data streams, to obtain a new behavior classification model may be specifically: training the behavior classification model based only on the correction data corresponding to the M data streams, to obtain the new behavior classification model; or may be specifically: training the behavior classification model based on the correction data corresponding to the M data streams and correction data corresponding to Y data streams in another network, to obtain the new behavior classification model, that is, the correction data used for training to obtain the new behavior classification model comes from at least two different networks, where the at least two different networks include two different local area networks, include two networks in different forms, or include two networks in different areas.

Optionally, if the correction data used for training to obtain the new behavior classification model comes from the at least two different networks, a network to which the M data streams belong may be referred to as a first network, and the Y data streams are from a second network other than the first network. That the first device trains the behavior classification model based on the correction data corresponding to the M data streams, to obtain the new behavior classification model may be specifically:

First, the first device corrects packet information of the Y data streams based on a difference between network configurations of the second network and the first network, to obtain corrected packet information of the Y data streams. This is mainly because: For two data streams whose feature information or packet information is originally the same, different feature information or packet information is finally reflected due to different network configurations of networks from which the two data streams come, and the correction is mainly to make measurement standards of the feature information or the packet information of the data stream from the second network and the feature information or the packet information of the data stream from the first network be consistent (in other words, be unified into same feature space), to make the feature information or the packet information of the two data streams more comparable, and finally help improve accuracy of the behavior classification model obtained through training.

For example, a packet length of a data stream in the second network is rewritten through data mapping based on an MTU of a data stream in the first network. For example, the MTU of the data stream sent by a device in the first network is 1500, an MTU of the data stream sent by a device in the second network is 1452, and information about a data stream sent by the device in the second network is as shown in Table 3. After the data mapping is performed on the information in Table 3 with reference to the MTU of the data stream sent by the device in the first network, information as shown in Table 4 is obtained.

TABLE 3

| Data stream class | Source | Packet direction | Packet length | Packet moment |
|---|---|---|---|---|
| Data stream class of video | First network | 1 | 76 | 0 |
| | | 0 | 1452 | 0.32 |
| | | 0 | 1452 | 0.38 |
| | | 0 | 329 | 0.41 |
| | | ... | | |

TABLE 4

| Data stream class | Source | Packet direction | Packet length | Packet moment |
|---|---|---|---|---|
| Data stream class of video | Second network | 1 | 76 | 0 |
| | | 0 | 1500 | 0.32 |
| | | 0 | 1500 | 0.38 |
| | | 0 | 233 | 0.41 |
| | | ... | | |

For example, a packet moment of a data stream in the second network is rewritten through data mapping based on packet moment distribution of a data stream in the first network. For example, a packet moment average of the data stream sent by a device in the second network is 10% greater than a packet moment average of the data stream sent by a device in the first network, and information about a data stream sent by the device in the second network is as shown in Table 5. After the data mapping is performed on the information in Table 5 with reference to the packet moment distribution of the data stream sent by the device in the first network, information as shown in Table 6 is obtained.

TABLE 5

| Data stream class | Source | Packet direction | Packet length | Packet moment |
|---|---|---|---|---|
| Data stream class of video | Second network | 1 | 76 | 0 |
| | | 0 | 1452 | 0.32 |
| | | 0 | 1452 | 0.38 |
| | | 0 | 329 | 0.41 |
| | | ... | | |

TABLE 6

| Data stream class | Source | Packet direction | Packet length | Packet moment |
|---|---|---|---|---|
| Data stream class of video | Second network | 1 | 76 | 0 |
| | | 0 | 1452 | 0.35 |
| | | 0 | 1452 | 0.42 |
| | | 0 | 329 | 0.45 |
| | | ... | | |

Then, after the packet information is corrected, the behavior classification model is trained based on packet information of the M data streams, the corrected packet information of the Y data streams, second data stream classes corresponding to the M data streams, and second data stream classes corresponding to the Y data streams, to obtain the new behavior classification model.

For example, it is assumed that M=10 (where update of the behavior classification model needs to start when a total amount of newly added correction data reaches 10), a protocol type of a network data stream d is the UDP, an IP address is 1.2.3.4, a port number is 10050, the port number 10050 is a common feature, data streams with the common feature that are transmitted in the art basically belong to the data type of the voice conference, a correspondence between the common feature 10050 and the data stream class of the voice conference has been added to the foregoing target correspondence, that is, has been stored in the address correction library, and the confidence weight vector (w1, w2), the first preset threshold $\theta 1$, and a second preset threshold $\theta 2$ remain unchanged.

In this case, for the data stream d, second confidences of classifying, by the content classification model, that the data stream d belongs to the data stream class of the desktop cloud, the data stream class of the voice conference, and the data stream class of the video conference are respectively 1, 0, and 0; and first confidences of classifying, by the behavior classification model based on packet information, that the data stream d belongs to the data stream class of the desktop cloud, the data stream class of the voice conference, and the data stream class of the video conference are respectively 0.9, 0, and 0. Therefore, comprehensive confidences corresponding to the three data stream classes are as follows:

Desktop cloud: 1x0.4+0.9x0.6=0.94, which is greater than $\theta 1$. Therefore, the current data stream d belongs to the data stream class of the desktop cloud, that is, a first data stream class corresponding to the current data stream d is the data stream class of the desktop cloud.

Voice conference: 0x0.4+0x0.6=0, which is less than $\theta 1$. Therefore, the current data stream d does not belong to the data stream class of the voice conference.

Video conference: 0x0.4+0x0.6=0, which is less than $\theta 1$. Therefore, the current data stream d does not belong to the data stream class of the video conference.

Because the comprehensive confidence of classifying that the data stream d belongs to the data stream class of the desktop cloud is 0.94, which is beyond the interval ($\theta 1$, $\theta 2$), the content classification model does not need to be updated (where an update principle is described below and is not described herein in detail).

It is determined, based on the foregoing target correspondence and the common feature of the current data stream d, that a second data stream class corresponding to the current data stream is the data stream class of the voice conference that is different from the first data stream class (namely, the data stream class of the desktop cloud) corresponding to the current data stream d. Therefore, the third device needs to send correction data of the current data stream d to the first device.

After the first device receives the correction data that is of the current data stream d and that is sent by the third device, if a total of 10 pieces of newly added correction data are exactly from the third device, the first device trains the behavior classification model with reference to the 10 pieces of newly added correction data, to obtain the new behavior classification model.

If a first confidence of classifying, by the updated behavior classification model, that the current data stream d belongs to the data stream class of the voice conference is 0.9, when the current data stream d appears again, a classification process of the current data stream d is as follows:

Second confidences of classifying, by the content classification model, that the current data stream d belongs to the data stream class of the desktop cloud, the data stream class of the voice conference, and the data stream class of the video conference are respectively 1, 0, and 0. First confidences of classifying, by the behavior classification model based on the packet information, that the current data stream d belongs to the data stream class of the desktop cloud, the data stream class of the voice conference, and the data stream class of the video conference are respectively 0.1, 0.9, and 0. Comprehensive confidences corresponding to the three data stream classes are as follows:

Desktop cloud: 1x0.4+0.1x0.6=0.46, which is less than $\theta 1$. Therefore, the current data stream d does not belong to the data stream class of the desktop cloud.

Voice conference: 0x0.4+0.9x0.6=0.54, which is greater than $\theta 1$. Therefore, the current data stream d belongs to the data stream class of the voice conference, that is, a first data stream class corresponding to the current data stream d is the data stream class of the voice conference.

Video conference: 0x0.4+0x0.6=0, which is less than $\theta 1$. Therefore, the current data stream d does not belong to the data stream class of the video conference.

Because the comprehensive confidence of classifying that the current data stream d belongs to the data stream class of the desktop cloud is 0.54, which is within the interval ($\theta 1$, $\theta 2$), the content classification model needs to be updated (where the update principle is described below and is not described herein in detail).

It is determined, based on the foregoing target correspondence and the common feature of the current data stream d, that a second data stream class corresponding to the current data stream is the data stream class of the voice conference that is the same as the determined first data stream class (namely, the data stream class of the voice conference) corresponding to the current data stream d. Therefore, the third device does not need to send, to the first device, information for retraining the behavior classification model.

Solution 2:

If the first data stream class corresponding to the current data stream is different from the second data stream class corresponding to the current data stream, the behavior classification model is updated based on the packet information of the current data stream and the second data stream class corresponding to the current data stream, to obtain a new behavior classification model. Optionally, this may be specifically: if the second data stream class of the current data stream is different from the first data stream class of the current data stream, and first data stream classes corresponding to a total of M data streams haven been currently different from second data stream classes corresponding to the M data streams, training the behavior classification model based on packet information of the M data streams and the second data stream classes respectively corresponding to the M data streams, to obtain the new behavior classification model, where the M data streams include the current data stream, and M is a preset reference threshold. How to train the behavior classification model based on the packet information of the M data streams and the second data stream classes respectively corresponding to the M data streams has been described in the foregoing solution 1, and details are not described herein again.

For a process of updating the content classification model, refer to step S307:

Step S307: The third device updates the content classification model based on a comprehensive confidence that is of the current data stream and that corresponds to the first data stream class and the second data stream class corresponding to the current data stream. The following enumerates two different update solutions.

Solution 1:

If the comprehensive confidence corresponding to the target data stream class is greater than the first preset threshold $\theta 1$ and less than the second preset threshold $\theta 2$, the third device sends the feature information and the second data stream class of the current data stream to the second device. The target data stream class is one of the at least one data stream class. If a confidence corresponding to a target data stream class is greater than the first preset threshold $\theta 1$, the target data stream class is considered as the first data stream class corresponding to the current data stream, where the second preset threshold is greater than the first preset threshold. For example, for the data stream a, the comprehensive confidence 0.3 corresponding to the data stream class of the desktop cloud is not within the interval ($\theta 1$, $\theta 2$). Therefore, information such as the feature information of the current data stream does not need to be sent to the second device. For another example, for the data stream b, the comprehensive confidence 0.54 corresponding to the data stream class of the desktop cloud is within the interval ($\theta 1$, $\theta 2$). Therefore, the feature information (for example, the destination IP address 10.129.56.39, the destination port number 443, and the protocol type TCP) and information (such as a name or an identifier) about the data stream class of the desktop cloud (where the first data stream class is sent when the second data stream class is not classified, where the first data stream class is exactly the data stream class of the desktop cloud herein; and the second data stream class is sent when the second data stream class is classified) that are of the current data stream need to be sent to the second device.

Correspondingly, the second device receives the feature information and the second data stream class (or the first data stream class, where the first data stream class is sent when the second data stream class is not classified) of the current data stream that are sent by the third device, that is, one data stream record is added to the second device. As shown in FIG. 5, a record for the data stream b is added. Then, the second device trains the content classification model based on the feature information and the second data stream class of the current data stream, to obtain a new content classification model.

After obtaining the new content classification model through training, the second device sends second model data to the third device, where the second model data is model data of the new content classification model, and is used to describe the new content classification model obtained by the second device by training the content classification model based on the feature information of the current data stream and the second data stream class corresponding to the current data stream. A content classification model includes a model structure (for example, a function form of the model) and a model parameter. The second model data is at least in the following several cases. Case 1: The second model data is a parameter value of the model parameter of the new content classification model. Case 2: The second model data is differential data of the new content classification model relative to the untrained content classification model, and is usually a difference between a parameter value of the model parameter of the new content classification model and a parameter value of the model parameter of the untrained content classification model. Optionally, for the case 1, the second model data may be specifically a matrix including parameter values of a plurality of parameters. For the case 2, the second model data (namely, the differential data) may be specifically a matrix including differences of a plurality of parameter values. For example, if a matrix including the parameter values of the model parameters of the untrained content classification model is [e1, f1, g1, h1], and a matrix including the parameter values of the model parameters of the new content classification model is [e2, f2, g2, h2], a matrix including differences of the four model parameters is [e2-e1, f2-f1, g2-g1, h2-h1]. Correspondingly, for the case 1, the second model data is [e1, f1, g1, h1]; for the case 2, the second model data (namely, the differential data) is [e2-e1, f2-f1, g2-g1, h2-h1]. Case 3: The second model data includes parameter values of the model structure and the model parameter that are of the new content classification model, namely, complete data of the new content classification model.

The second model data may be specifically a model file. Commonly, the AI model file of the open-source Keras library is the h5 file/JSON file, and the AI model file of the open-source Sklearn library is the pkl/m file. These files are binary and are used to store the parameter value of the model structure and/or the parameter value of the model parameter. The h5 file is used to describe the parameter value of the model parameter, and the JSON file is used to describe the model structure. During specific implementation, the second model data in both the case 1 and the case 2 may be the h5 file, and the second model data in the case 3 may include the h5 file and the JSON file.

Then, the third device receives the second model data sent by the second device, and updates the content classification model based on the received second model data. If the second model data is the complete data of the new content classification model, the third device may directly load the second model data to generate the new content classification model to replace the current content classification model, and subsequently classify a data stream class by using the new content classification model. If the second model data is the parameter value of the model parameter of the new content classification model, the parameter value is substituted into the current content classification model to replace the old parameter value, to obtain the new content classification model. If the second model data is the difference between the parameter value of the model parameter of the new content classification model and the parameter value of the model parameter of the content classification model not updated, the new parameter value is obtained based on the difference and the parameter value of the model parameter of the content classification model not updated, to obtain the new content classification model.

In the record for the data stream b, the destination IP address 10.129.56.39, the destination port number 443, and the protocol type TCP all correspond to the data stream class of the desktop cloud. Therefore, when the updated content classification model is used to estimate the input data stream b, an estimated second confidence corresponding to the data stream class of the desktop cloud is 1. Optionally, because there are similarities between the feature information of the data stream a and the feature information of the data stream b, for example, the destination IP addresses are in a same network segment, the port numbers are similar, and the protocol types are the same, when the updated content classification model is used to estimate the input data stream a, an estimation result is closer to an estimation result of the data stream b. For example, an estimated second confidence corresponding to the data stream class of the desktop cloud may be 0.6.

A procedure for estimating the data stream classes of the data stream a and the data stream b that subsequently appear in a network is as follows.

The confidence weight vector (w1, w2), the first preset threshold $\theta 1$, and the second preset threshold $\theta 2$ remain unchanged.

In this case, for the data stream a, second confidences of classifying, by the content classification model, that the data stream a belongs to the data stream class of the desktop cloud, the data stream class of the voice conference, and the data stream class of the video conference are respectively 0.6, 0, and 0; and first confidences of classifying, by the behavior classification model based on the packet information, that the data stream a belongs to the data stream class of the desktop cloud, the data stream class of the voice conference, and the data stream class of the video conference are respectively 0.5, 0, and 0. Therefore, comprehensive confidences corresponding to the three data stream classes are as follows:

Desktop cloud: 0.6x0.4+0.5x0.6=0.54, which is greater than $\theta 1$. Therefore, the current data stream belongs to the data stream class of the desktop cloud, that is, a first data stream class that corresponds to the current data stream a and that is obtained after the content classification model is updated is the data stream class of the desktop cloud.

Voice conference: 0x0.4+0x0.6=0, which is less than $\theta 1$. Therefore, the current data stream does not belong to the data stream class of the voice conference.

Video conference: 0x0.4+0x0.6=0, which is less than $\theta 1$. Therefore, the current data stream does not belong to the data stream class of the video conference.

Because the comprehensive confidence of classifying that the data stream a belongs to the data stream class of the desktop cloud is 0.54, which is within the interval ($\theta 1$, $\theta 2$), the feature information and information about the second data stream class (or the first data stream class, where the first data stream class is sent when the second data stream class is not classified) that are of the current data stream need to be sent to the second device, to subsequently update the content classification model (the update principle has been described above and is not described here again).

In this case, for the data stream b, second confidences of classifying, by the content classification model, that the data stream b belongs to the data stream class of the desktop cloud, the data stream class of the voice conference, and the data stream class of the video conference are respectively 1, 0, and 0; and first confidences of classifying, by the behavior classification model based on the packet information, that the data stream b belongs to the data stream class of the desktop cloud, the data stream class of the voice conference, and the data stream class of the video conference are respectively 0.9, 0, and 0. Therefore, comprehensive confidences corresponding to the three data stream classes are as follows:

Desktop cloud: 1x0.4+0.9x0.6=0.94, which is greater than $\theta 1$. Therefore, the current data stream belongs to the data stream class of the desktop cloud, that is, a first data stream class that corresponds to the current data stream b and that is obtained after the content classification model is updated is the data stream class of the desktop cloud.

Voice conference: 0x0.4+0x0.6=0, which is less than $\theta 1$. Therefore, the current data stream does not belong to the data stream class of the voice conference.

Video conference: 0x0.4+0x0.6=0, which is less than $\theta 1$. Therefore, the current data stream does not belong to the data stream class of the video conference.

Because the comprehensive confidence of classifying that the data stream b belongs to the data stream class of the desktop cloud is 0.94, which is beyond the interval (θ1, θ2), the feature information and information about the second data stream class (or the first data stream class, where the first data stream class is sent when the second data stream class is not classified) that are of the current data stream do not need to be sent to the second device.

Optionally, if a data stream arrives, a second data stream class corresponding to the data stream is not determined based on the foregoing correspondence but a first data stream class corresponding to the data stream is finally determined by using the behavior classification model and the content classification model, and feature information in a first record in a plurality of records is the same as feature information of the data stream but a data stream class in the first record is different from the first data stream class corresponding to the data stream, the data stream class in the first record is updated to the first data stream class corresponding to the data stream, to obtain a second record, where each of the plurality of records includes feature information and a data stream class. Then, the content classification model is trained by using a plurality of records including the second record, to obtain a new content classification model. Optionally, one of the plurality of records includes the feature information of the current data stream and the second data stream class corresponding to the current data stream. A cloud-based elastic deployment scenario exists in the network. For example, a cloud resource whose destination IP address is 10.129.56.39, destination port number is 443, and protocol type is the TCP changes from serving the desktop cloud to serving the video conference. Therefore, a part of the plurality of records need to be updated. After the record is updated in the foregoing manner, the content classification model may be trained based on more accurate information. This helps improve classification accuracy of the content classification model.

For example, a protocol type of the data stream c is the TCP, a destination IP address of the data stream c is 10.129.56.40, and a destination port number of the data stream c is 444.

In this case, for the data stream c, second confidences of classifying, by the content classification model, that the data stream c belongs to the data stream class of the desktop cloud, the data stream class of the voice conference, and the data stream class of the video conference are respectively 1, 0, and 0; and first confidences of classifying, by the behavior classification model based on packet information, that the data stream c belongs to the data stream class of the desktop cloud, the data stream class of the voice conference, and the data stream class of the video conference are respectively 0, 0, and 0.9. Therefore, comprehensive confidences corresponding to the three data stream classes are as follows:

Desktop cloud: 1x0.4+0x0.6=0.4, which is less than θ1. Therefore, the current data stream does not belong to the data stream class of the desktop cloud.

Voice conference: 0x0.4+0x0.6=0, which is less than θ1. Therefore, the current data stream does not belong to the data stream class of the voice conference.

Video conference: 0x0.4+0.9x0.6=0.54, which is greater than θ1. Therefore, the current data stream belongs to the data stream class of the video conference, that is, a first data stream class that corresponds to the current data stream c and that is obtained after the content classification model is updated is the data stream class of the video conference.

Because the comprehensive confidence of classifying that the data stream c belongs to the data stream class of the video conference is 0.54, which is within the interval (θ1, θ2), feature information and the first data stream class of the current data stream need to be sent to the second device. Correspondingly, the second device receives the feature information and the first data stream class that are of the current data stream and that are sent by the third device, that is, one data stream record is added to the second device. As shown in FIG. 6, a record for the data stream c is added.

By comparison between the record for the data stream c and a record for a data stream f, if data stream classes (namely, application types) are different but feature information (such as destination IP addresses, destination port numbers, and protocol types) is the same, the existing record for the data stream f is modified, so that the protocol type TCP, the destination IP address 10.129.56.40, and the destination port number 444 all correspond to the data stream class of the video conference instead of the data stream class of the desktop cloud, where the unmodified record is the first record, and a modified record is the second record.

It may be understood that, after the first record is updated to the second record, and the content classification model is trained based on the plurality of records including the second record to obtain the new content classification model, and when the data stream c is input into the updated (namely, new) content classification model again, second confidences of classifying that the data stream c belongs to the data stream class of the desktop cloud and the data stream class of the video conference are respectively 0 and 1. Optionally, the plurality of records herein include the feature information and the second data stream class that correspond to the current data stream.

Solution 2: If the comprehensive confidence corresponding to the target data stream class is less than the second preset threshold, the third device does not need to send the feature information and the second data stream class of the current data stream to the second device, but updates the content classification model based on the feature information and the second data stream class of the current data stream to obtain the new content classification model. The target data stream class is one of the at least one data stream class. If a confidence corresponding to a target data stream class is greater than the first preset threshold θ1, the target data stream class is considered as the first data stream class corresponding to the current data stream, where the second preset threshold is greater than the first preset threshold. For a principle of the solution 2, refer to the foregoing solution 1, and the third device replaces the second device in the solution 1 to perform the operations.

In the method described in FIG. 3, after the first data stream class is classified based on the behavior classification model, and the second data stream class is classified based on the preset correspondence about the common feature, if the first data stream class is different from the second data stream class, the correction data, namely, the training sample, for updating the behavior classification model is generated. The correction data is autonomously obtained by the device when the first data stream class corresponding to the current data stream is different from the second data stream class corresponding to the current data stream, and no manual labeling is required. Therefore, efficiency of obtaining sample data for training the behavior classification model is higher. In addition, the correction data includes the packet information and the accurate data stream class that are generated when a classification result of the behavior classification model is inaccurate. Therefore, the behavior classification model is subsequently updated based on the correction data, to obtain a behavior classification model with a more accurate classification effect.

Furthermore, the first data stream class corresponding to the current data stream may be specifically obtained based on the content classification model and the behavior classification model, and then the first data stream class is corrected to obtain the final data stream class of the current data stream. The behavior classification model is pre-obtained through training based on the packet information and the data stream classes of the plurality of data stream samples, and the content classification model is obtained through training based on the feature information of the data stream and the data stream class classified by the behavior classification model. Therefore, the feature information, the packet information, and the like are analyzed by using the content classification model and the behavior classification model, so that the first data stream class corresponding to the current data stream can be more accurately predicted. In addition, because the data stream class that is in the data stream sample and that is used for training the content classification model is classified by the behavior classification model, there is no need to collect a large amount of data required for training, to avoid insufficient data integrity.

Moreover, in a process in which the third device classifies a data stream class by using the behavior classification model that has been obtained through training, if it is found by using an address correction model (including the correspondence about the common feature) that a deviation occurs on a classification result, when deviations occur for a plurality of times in total, the first device or the third device retrains the behavior classification model with reference to related data causing the deviations, and the behavior classification model on the third device is updated after the new behavior classification model is obtained through training. The iteratively updated behavior classification model can meet differentiated requirements of different users, different networks, and different scenarios, and has better generalization performance and commonality.

Furthermore, in a process in which the third device classifies the data stream class by using the content classification model that has been obtained through training, if it is found, through comparison between the comprehensive confidence and the preset update threshold θ2, that update is required, when the update is required for a plurality of times in total, the second device or the third device retrains the content classification model with reference to related data that causes the comprehensive confidence to be lower than θ2, and the content classification model on the third device is updated after the new content classification model is obtained through training. The iteratively updated content classification model can meet differentiated requirements of different users, different networks, and different scenarios, and has better generalization performance and commonality.

The foregoing describes in detail the method in embodiments of the present application, and the following provides apparatuses in embodiments of the present application.

FIG. 7 shows a data stream classification model updating apparatus 70 according to an embodiment of the present application. The apparatus 70 may be the third device in the method embodiment shown in FIG. 3 or a component or a module in the third device. The apparatus 70 may include a first determining unit 701, a second determining unit 702, and an obtaining unit 703. Detailed descriptions of the units are as follows:

The first determining unit 701 is configured to determine, based on packet information of a current data stream and a behavior classification model, a first data stream class corresponding to the current data stream, where the packet information includes one or more of a packet length, a packet transmission speed, a packet time interval, and a packet direction, and the behavior classification model is a model obtained through training based on packet information and data stream classes of a plurality of data stream samples.

The second determining unit 702 is configured to determine, based on a target correspondence and a common feature of the current data stream, a second data stream class corresponding to the current data stream, where the target correspondence is a correspondence between a plurality of common features and a plurality of data stream classes.

The obtaining unit 703 is configured to: when the first data stream class corresponding to the current data stream is different from the second data stream class corresponding to the current data stream, obtain correction data corresponding to the current data stream, where the correction data corresponding to the current data stream includes the packet information of the current data stream and the second data stream class corresponding to the current data stream, and the correction data is used as a training sample to update the behavior classification model.

In the foregoing method, after the first data stream class is classified based on the behavior classification model, and the second data stream class is classified based on the preset correspondence about the common feature, if the first data stream class is different from the second data stream class, the correction data, namely, the training sample, for updating the behavior classification model is generated. The correction data is autonomously obtained by the device when the first data stream class corresponding to the current data stream is different from the second data stream class corresponding to the current data stream, and no manual labeling is required. Therefore, efficiency of obtaining sample data for training the behavior classification model is higher. In addition, the correction data includes the packet information and the accurate data stream class that are generated when a classification result of the behavior classification model is inaccurate. Therefore, the behavior classification model is subsequently updated based on the correction data, to obtain a behavior classification model with a more accurate classification effect.

In a possible implementation, when determining, based on the target correspondence and the common feature of the current data stream, the second data stream class corresponding to the current data stream, the second determining unit is specifically configured to: if the common feature of the current data stream is the same as a first common feature in the correspondence, use a data stream class corresponding to the first common feature as the second data stream class corresponding to the current data stream.

In another possible implementation, the common feature is a well-known port number or a well-known domain name system DNS.

In another possible implementation, the apparatus 70 further includes:
  a first sending unit, configured to: after the obtaining unit obtains the correction data corresponding to the current data stream, send the correction data corresponding to the current data stream to a first device, where the correction data corresponding to the current data stream includes the packet information of the current data stream and the second data stream class corresponding to the current data stream; and
  a first receiving unit, configured to receive first model data sent by the first device, where the first model data is used to describe a new behavior classification model obtained by the first device by training the behavior classification model based on the packet information of the current data stream and the second data stream class corresponding to the current data stream.

In the method, the specified first device that has a strong computing capability implements the operation of obtaining the new behavior classification model through training. The third device may update the behavior classification model of the third device based on only a new model parameter sent by the first device. In this way, the third device can concentrate main computing resources on packet forwarding, to effectively ensure packet forwarding performance of the third device.

In another possible implementation, the apparatus 70 further includes: a first updating unit, configured to: after the obtaining unit obtains the correction data corresponding to the current data stream, update the behavior classification model based on the correction data, to obtain a new behavior classification model.

In the method, the third device performs the operation of training the behavior classification model. This is equivalent to that the behavior classification model is used and trained on the same device.

In another possible implementation, when updating the behavior classification model based on the correction data, to obtain the new behavior classification model, the first updating unit is specifically configured to:

if first data stream classes corresponding to a total of M data streams have been currently different from second data stream classes corresponding to the M data streams, train the behavior classification model based on packet information of the M data streams and the second data stream classes respectively corresponding to the M data streams, to obtain the new behavior classification model, where the M data streams are an amount accumulated from a moment at which the behavior classification model becomes valid to a current moment or an amount accumulated within a preset time period, or a proportion of M in a total quantity of data streams that are transmitted after the behavior classification model becomes valid exceeds a preset threshold, where the M data streams include the current data stream.

In the method, there is a trigger condition for updating the behavior classification model. Specifically, it depends on whether the first data stream classes corresponding to the total of M data streams have been currently different from the second data stream classes corresponding to the M data streams. Proper configuration of M can prevent frequent update of the behavior classification model, to avoid unnecessary calculation overheads, and can avoid a problem of inaccurate prediction performed by the behavior classification model due to insufficient update frequency.

In another possible implementation, when training the behavior classification model based on the packet information of the M data streams and the second data stream classes respectively corresponding to the M data streams, to obtain the new behavior classification model, the first updating unit is specifically configured to:

train the behavior classification model based on the packet information of the M data streams, the second data stream classes respectively corresponding to the M data streams, packet information of Y data streams, and second data stream classes respectively corresponding to the Y data streams, to obtain the new behavior classification model, where the Y data streams and the M data streams are from a same network; or the Y data streams and the M data streams are from at least two different networks, where the at least two different networks include two different local area networks, include two networks in different forms, or include two networks in different areas.

It may be understood that, generalization performance of the behavior classification model can be improved through training based on related information of data streams from different networks, to achieve a better prediction effect.

In another possible implementation, if the Y data streams and the M data streams are from the at least two different networks, when training the behavior classification model based on the packet information of the M data streams, the second data stream classes respectively corresponding to the M data streams, the packet information of the Y data streams, and the second data stream classes respectively corresponding to the Y data streams, to obtain the new behavior classification model, the first updating unit is specifically configured to:

correct the packet information of the Y data streams based on a difference between a network configuration of a second network to which the Y data streams belong and a network configuration of a first network to which the M data streams belong, to obtain corrected packet information of the Y data streams; and train the behavior classification model based on the packet information of the M data streams, the corrected packet information of the Y data streams, the second data stream classes corresponding to the M data streams, and the second data stream classes corresponding to the Y data streams, to obtain the new behavior classification model.

In the method, packet information of the data streams from the different networks is normalized, so that the packet information of the data streams from the different networks is more comparable, and the behavior classification model obtained through training based on normalized packet information has better generalization performance and higher prediction accuracy.

In another possible implementation, when determining, based on the packet information of the current data stream and the behavior classification model, the first data stream class corresponding to the current data stream, the first determining unit is specifically configured to:

determine, based on the packet information and feature information of the current data stream, the behavior classification model, and a content classification model, the first data stream class corresponding to the current data stream, where the feature information includes one or more of a destination address and a protocol type, the content classification model is a model obtained based on feature information and one or more data stream class of one or more historical data streams, and the data stream class of the historical data stream is obtained based on the behavior classification model.

In the foregoing method, the first data stream class corresponding to the current data stream is obtained based on the content classification model and the behavior classification model, and then the first data stream class is corrected to obtain a final data stream class of the current data stream. The behavior classification model is pre-obtained through training based on the packet information and the data stream classes of the plurality of data stream samples, and the content classification model is obtained through training based on the feature information of the data stream and the data stream class classified by the behavior classification model. Therefore, the feature information, the packet information, and the like are analyzed by using the content classification model and the behavior classification model, so that the first data stream class corresponding to the current data stream can be more accurately predicted. In addition, because the data stream class that is in a data stream sample and that is used for training the content classification model is classified by the behavior classification model, there is no need to collect a large amount of data required for training, to avoid insufficient data integrity.

In another possible implementation, when determining, based on the packet information and the feature information of the current data stream, the behavior classification model, and the content classification model, the first data stream class corresponding to the current data stream, the first determining unit is specifically configured to:

obtain, based on the packet information of the current data stream and the behavior classification model, at least one first confidence that is of the current data stream and that corresponds to at least one data stream class;

obtain, based on the feature information of the current data stream and the content classification model, at least one second confidence that is of the current data stream and that corresponds to the at least one data stream class; and determine the first data stream class of the current data stream based on the at least one first confidence and the at least one second confidence.

In another possible implementation, when determining the first data stream class of the current data stream based on the at least one first confidence and the at least one second confidence, the first determining unit is specifically configured to:

calculate, based on the first confidence corresponding to a target data stream class, a weight value of the first confidence, the second confidence corresponding to the target data stream class, and a weight value of the second confidence, a comprehensive confidence corresponding to the target data stream class, where the target data stream class is any one of the at least one data stream class; and if the comprehensive confidence corresponding to the target data stream class is greater than a first preset threshold, determine the target data stream class as the first data stream class corresponding to the current data stream.

In another possible implementation, the apparatus 70 further includes:

a second sending unit, configured to: when the comprehensive confidence corresponding to the target data stream class is less than a second preset threshold, send the feature information and the second data stream class of the current data stream to a second device, where the second preset threshold is greater than the first preset threshold; and a second receiving unit, configured to receive second model data sent by the second device, where the second model data is used to describe a new content classification model obtained by the second device by training the content classification model based on the feature information and the second data stream class of the current data stream.

In the foregoing method, the content classification model is updated by using a determining result of the data stream class of the current data stream. Specifically, the second preset threshold is introduced. When the comprehensive confidence corresponding to the first data stream class is less than the second preset threshold, related information of the current data stream is sent to the second device for training, to obtain the new content classification model, so that a next determining result is more accurate.

In another possible implementation, the apparatus 70 further includes:

a second updating unit, configured to: when the comprehensive confidence corresponding to the target data stream class is less than the second preset threshold, update the content classification model based on the feature information and the second data stream class of the current data stream, to obtain a new content classification model, where the second preset threshold is greater than the first preset threshold.

In the foregoing method, the content classification model is updated by using a determining result of the data stream class of the current data stream. Specifically, the second preset threshold is introduced. When the comprehensive confidence corresponding to the first data stream class is less than the second preset threshold, training is performed based on related information of the current data stream, to obtain the new content classification model, so that a next determining result is more accurate.

In another possible implementation, the apparatus 70 further includes:

a third sending unit, configured to: after the second determining unit determines, based on the target correspondence and the common feature of the current data stream, the second data stream class corresponding to the current data stream, send the second data stream class corresponding to the current data stream to an operations support system OSS, where information about the second data stream class of the current data stream is used by the OSS to generate a traffic control policy for the current data stream.

That is, after the data stream class of the current data stream is determined, related information of the data stream class of the current data stream is notified to the OSS. In this way, the OSS can generate the traffic control policy for the current data stream based on the data stream class of the current data stream. For example, when the first data stream class of the current data stream is a video stream of video conference, the traffic control policy corresponding to the current data stream is defined as a policy of preferential transmission, that is, when a plurality of data streams are to be transmitted, the current data stream is preferentially transmitted.

In another possible implementation, the packet length includes one or more of an Ethernet frame length, an IP packet length, a transmission protocol packet length, and a header length in a packet, and a transmission protocol includes the transmission control protocol TCP and/or the user datagram protocol UDP. It should be noted that for implementation of the units, refer to the corresponding descriptions in the method embodiment shown in FIG. 3.

FIG. 8 shows a data stream classification model updating apparatus 80 according to an embodiment of the present application. The apparatus 80 may be the first device in the method embodiment shown in FIG. 3 or a component or a module in the first device. The apparatus 80 may include a first receiving unit 801, an obtaining unit 802, and a first sending unit 803. Detailed descriptions of the units are as follows:

The first receiving unit 801 is configured to receive correction data that corresponds to a current data stream and that is sent by a third device, where the correction data corresponding to the current data stream includes packet information of the current data stream and a second data stream class corresponding to the current data stream, the second data stream class corresponding to the current data stream is determined by the third device based on a target correspondence and a common feature of the current data stream, and the target correspondence is a correspondence between a plurality of common features and a plurality of data stream classes.

The obtaining unit 802 is configured to: when correction data corresponding to a total of M data streams is received from the third device, train a behavior classification model based on the correction data corresponding to the M data streams, to obtain a new behavior classification model, where the M data streams are an amount accumulated from a moment at which the behavior classification model becomes valid to a current moment or an amount accumulated within a preset time period, or a proportion of M in a total quantity of data streams that are transmitted after the behavior classification model becomes valid exceeds a preset threshold, where the M data streams include the current data stream.

The first sending unit 803 is configured to send first model data to the third device, where the first model data is used to describe the new behavior classification model, the behavior classification model is a model obtained based on packet information and data stream classes of a plurality of data stream samples, the behavior classification model is used to determine a data stream class of an input to-be-predicted data stream based on packet information of the to-be-predicted data stream, and the packet information includes one or more of a packet length, a packet transmission speed, a packet time interval, and a packet direction.

In the foregoing method, when a total of a specific amount of correction data is from the third device, the first device trains the behavior classification model based on the specific amount of correction data to obtain the new behavior classification model, and sends, to the third device when obtaining the new behavior classification model through training, information for describing the new behavior classification model, so that the third device updates the behavior classification model on the third device by using the information. In the foregoing method, the third device does not need to perform model training, but directly obtains the new behavior classification model based on a model training result from the first device. This helps the third device fully use computing resources to classify a data stream class.

In a possible implementation, the common feature is a well-known port number or a well-known domain name system DNS.

In another possible implementation, the correction data corresponding to the current data stream is sent by the third device when a first data stream class corresponding to the current data stream is different from the second data stream class corresponding to the current data stream, the first data stream class corresponding to the current data stream is determined by the third device based on the packet information and feature information of the current data stream, the behavior classification model, and a content classification model, the feature information includes one or more of a destination address and a protocol type, the content classification model is obtained based on feature information and one or more data stream class of one or more historical data streams, and the data stream class of the historical data stream is obtained based on the behavior classification model.

In another possible implementation, when training the behavior classification model based on the correction data corresponding to the M data streams, to obtain the new behavior classification model, the obtaining unit is specifically configured to:
train the behavior classification model based on the correction data corresponding to the M data streams and correction data corresponding to Y data streams, to obtain the new behavior classification model, where
the Y data streams and the M data streams are from a same network; or
the Y data streams and the M data streams are from at least two different networks, where the at least two different networks include two different local area networks, include two networks in different forms, or include two networks in different areas.

It may be understood that, generalization performance of the behavior classification model can be improved through training based on related information of data streams from different networks, to achieve a better prediction effect.

In another possible implementation, if the Y data streams and the M data streams are from the at least two different networks, when training the behavior classification model based on the correction data corresponding to the M data streams and the correction data corresponding to the Y data streams, to obtain the new behavior classification model, the obtaining unit is specifically configured to:
correct packet information of the Y data streams based on a difference between a network configuration of a second network to which the Y data streams belong and a network configuration of a first network to which the M data streams belong, to obtain corrected packet information of the Y data streams; and
train the behavior classification model based on packet information of the M data streams, the corrected packet information of the Y data streams, second data stream classes corresponding to the M data streams, and second data stream classes corresponding to the Y data streams, to obtain the new behavior classification model.

In the method, packet information of the data streams from the different networks is normalized, so that the packet information of the data streams from the different networks is more comparable, and the behavior classification model obtained through training based on normalized packet information has better generalization performance and higher prediction accuracy.

In another possible implementation, the apparatus 80 further includes:
a second receiving unit, configured to receive the feature information and information about the second data stream class that are of the current data stream and that are sent by the third device;
a generation unit, configured to train the content classification model based on the feature information and the second data stream class of the current data stream, to obtain a new content classification model; and
a second sending unit, configured to send second model data to the third device, where the second model data is used to describe the new content classification model, the content classification model is a model obtained based on the feature information and the data stream class of the one or more historical data streams, the content classification model is used to estimate a data stream class of an input to-be-predicted data stream based on feature information of the to-be-predicted data stream, the data stream class of the historical data stream is obtained based on the behavior classification model, the behavior classification model is the model obtained based on the packet information and the data stream classes of the plurality of data stream samples, the packet information includes the one or more of the packet length, the packet transmission speed, the packet time interval, and the packet direction, and the feature information includes the one or more of the destination address and the protocol type.

In the foregoing method, in a process in which the third device classifies a data stream class by using the content classification model that has been obtained through training, if it is found that accuracy of the model is low, the third device triggers the first device to retrain the content classification model with reference to related data, and updates the content classification model on the third device after the new content classification model is obtained through training. This manner of iteratively updating the content classification model can meet differentiated requirements of different users, different networks, and different scenarios, and has better generalization performance and commonality.

It should be noted that for implementation of the units, refer to the corresponding descriptions in the method embodiment shown in FIG. 3.

Figure 9:
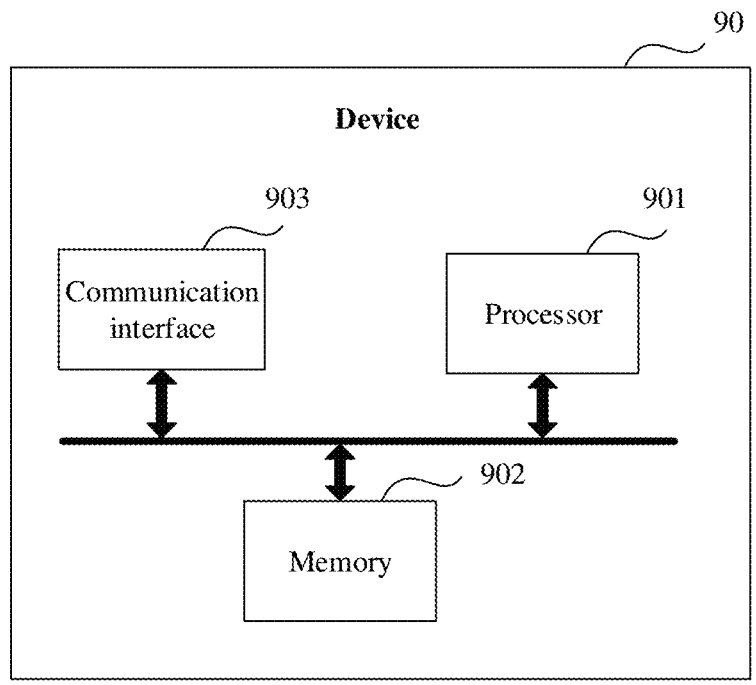
FIG. 9 is a schematic diagram of a structure of a data stream classification model updating device according to an embodiment of the present application.

FIG. 9 shows a device 90 according to an embodiment of the present application. The device 90 may be the third device in the method embodiment shown in FIG. 3. The device 90 includes a processor 901, a memory 902, and a communication interface 903. The processor 901, the memory 902, and the communication interface 903 are connected to each other through a bus.

The memory 902 includes, but is not limited to, a random access memory (RAM), a read-only memory (ROM), an erasable programmable read-only memory (EPROM), or a compact disc read-only memory (CD-ROM). The memory 902 is configured to store related computer programs and data. The communication interface 903 is configured to receive and send data.

The processor 901 may be one or more central processing units (CPUs). When the processor 901 is one CPU, the CPU may be a single-core CPU, or may be a multi-core CPU.

The processor 901 reads computer program code stored in the memory 902, to perform the following operations:
  determining, based on packet information of a current data stream and a behavior classification model, a first data stream class corresponding to the current data stream, where the packet information includes one or more of a packet length, a packet transmission speed, a packet time interval, and a packet direction, and the behavior classification model is a model obtained through training based on packet information and data stream classes of a plurality of data stream samples;
  determining, based on a target correspondence and a common feature of the current data stream, a second data stream class corresponding to the current data stream, where the target correspondence is a correspondence between a plurality of common features and a plurality of data stream classes; and
  if the first data stream class corresponding to the current data stream is different from the second data stream class corresponding to the current data stream, obtaining correction data corresponding to the current data stream, where the correction data corresponding to the current data stream includes the packet information of the current data stream and the second data stream class corresponding to the current data stream, and the correction data is used as a training sample to update the behavior classification model.

In the foregoing method, after the first data stream class is classified based on the behavior classification model, and the second data stream class is classified based on the preset correspondence about the common feature, if the first data stream class is different from the second data stream class, the correction data, namely, the training sample, for updating the behavior classification model is generated. The correction data is autonomously obtained by the device when the first data stream class corresponding to the current data stream is different from the second data stream class corresponding to the current data stream, and no manual labeling is required. Therefore, efficiency of obtaining sample data for training the behavior classification model is higher. In addition, the correction data includes the packet information and the accurate data stream class that are generated when a classification result of the behavior classification model is inaccurate. Therefore, the behavior classification model is subsequently updated based on the correction data, to obtain a behavior classification model with a more accurate classification effect.

In a possible implementation, when determining, based on the target correspondence and the common feature of the current data stream, the second data stream class corresponding to the current data stream, the processor is specifically configured to:
  if the common feature of the current data stream is the same as a first common feature in the correspondence, use a data stream class corresponding to the first common feature as the second data stream class corresponding to the current data stream.

In another possible implementation, the common feature is a well-known port number or a well-known domain name system DNS.

In another possible implementation, after obtaining the correction data corresponding to the current data stream, the processor is further configured to:
  send, through the communication interface, the correction data corresponding to the current data stream to a first device, where the correction data corresponding to the current data stream includes the packet information of the current data stream and the second data stream class corresponding to the current data stream; and
  receive, through the communication interface, first model data sent by the first device, where the first model data is used to describe a new behavior classification model obtained by the first device by training the behavior classification model based on the packet information of the current data stream and the second data stream class corresponding to the current data stream.

In the method, the specified first device that has a strong computing capability implements the operation of obtaining the new behavior classification model through training. The third device may update the behavior classification model of the third device based on only a new model parameter sent by the first device. In this way, the third device can concentrate main computing resources on packet forwarding, to effectively ensure packet forwarding performance of the third device.

In another possible implementation, after obtaining the correction data corresponding to the current data stream, the processor is specifically configured to update the behavior classification model based on the correction data, to obtain a new behavior classification model.

In the method, the third device performs the operation of training the behavior classification model. This is equivalent to that the behavior classification model is used and trained on the same device.

In another possible implementation, when updating the behavior classification model based on the correction data, to obtain the new behavior classification model, the processor is specifically configured to:

if first data stream classes corresponding to a total of M data streams have been currently different from second data stream classes corresponding to the M data streams, train the behavior classification model based on packet information of the M data streams and the second data stream classes respectively corresponding to the M data streams, to obtain the new behavior classification model, where the M data streams are an amount accumulated from a moment at which the behavior classification model becomes valid to a current moment or an amount accumulated within a preset time period, or a proportion of M in a total quantity of data streams that are transmitted after the behavior classification model becomes valid exceeds a preset threshold, where the M data streams include the current data stream, and M is a preset reference threshold.

In the method, there is a trigger condition for updating the behavior classification model. Specifically, it depends on whether the first data stream classes corresponding to the total of M data streams have been currently different from the second data stream classes corresponding to the M data streams. Proper configuration of M can prevent frequent update of the behavior classification model, to avoid unnecessary calculation overheads, and can avoid a problem of inaccurate prediction performed by the behavior classification model due to insufficient update frequency.

In another possible implementation, when training the behavior classification model based on the packet information of the M data streams and the second data stream classes respectively corresponding to the M data streams, to obtain the new behavior classification model, the processor is specifically configured to:

train the behavior classification model based on the packet information of the M data streams, the second data stream classes respectively corresponding to the M data streams, packet information of Y data streams, and second data stream classes respectively corresponding to the Y data streams, to obtain the new behavior classification model, where the Y data streams and the M data streams are from a same network; or the Y data streams and the M data streams are from at least two different networks, where the at least two different networks include two different local area networks, include two networks in different forms, or include two networks in different areas.

It may be understood that, generalization performance of the behavior classification model can be improved through training based on related information of data streams from different networks, to achieve a better prediction effect.

In another possible implementation, if the Y data streams and the M data streams are from the at least two different networks, when training the behavior classification model based on the packet information of the M data streams, the second data stream classes respectively corresponding to the M data streams, the packet information of the Y data streams, and the second data stream classes respectively corresponding to the Y data streams, to obtain the new behavior classification model, the processor is specifically configured to:

correct the packet information of the Y data streams based on a difference between a network configuration of a second network to which the Y data streams belong and a network configuration of a first network to which the M data streams belong, to obtain corrected packet information of the Y data streams; and train the behavior classification model based on the packet information of the M data streams, the corrected packet information of the Y data streams, the second data stream classes corresponding to the M data streams, and the second data stream classes corresponding to the Y data streams, to obtain the new behavior classification model.

In the method, packet information of the data streams from the different networks is normalized, so that the packet information of the data streams from the different networks is more comparable, and the behavior classification model obtained through training based on normalized packet information has better generalization performance and higher prediction accuracy.

In another possible implementation, when determining, based on the packet information of the current data stream and the behavior classification model, the first data stream class corresponding to the current data stream, the processor is specifically configured to:

determine, based on the packet information and feature information of the current data stream, the behavior classification model, and a content classification model, the first data stream class corresponding to the current data stream, where the feature information includes one or more of a destination address and a protocol type, the content classification model is a model obtained based on feature information and one or more data stream class of one or more historical data streams, and the data stream class of the historical data stream is obtained based on the behavior classification model.

In the foregoing method, the first data stream class corresponding to the current data stream is specifically obtained based on the content classification model and the behavior classification model, and then the first data stream class is corrected to obtain a final data stream class of the current data stream. The behavior classification model is pre-obtained through training based on the packet information and the data stream classes of the plurality of data stream samples, and the content classification model is obtained through training based on the feature information of the data stream and the data stream class classified by the behavior classification model. Therefore, the feature information, the packet information, and the like are analyzed by using the content classification model and the behavior classification model, so that the first data stream class corresponding to the current data stream can be more accurately predicted. In addition, because the data stream class that is in a data stream sample and that is used for training the content classification model is classified by the behavior classification model, there is no need to collect a large amount of data required for training, to avoid insufficient data integrity.

In another possible implementation, when determining, based on the packet information and the feature information of the current data stream, the behavior classification model, and the content classification model, the first data stream class corresponding to the current data stream, the processor is specifically configured to:

obtain, based on the packet information of the current data stream and the behavior classification model, at least one first confidence that is of the current data stream and that corresponds to at least one data stream class;

obtain, based on the feature information of the current data stream and the content classification model, at least one second confidence that is of the current data stream and that corresponds to the at least one data stream class; and determine the first data stream class of the current data stream based on the at least one first confidence and the at least one second confidence.

In another possible implementation, when determining the first data stream class of the current data stream based on the at least one first confidence and the at least one second confidence, the processor is specifically configured to:

calculate, based on the first confidence corresponding to a target data stream class, a weight value of the first confidence, the second confidence corresponding to the target data stream class, and a weight value of the second confidence, a comprehensive confidence corresponding to the target data stream class, where the target data stream class is any one of the at least one data stream class; and if the comprehensive confidence corresponding to the target data stream class is greater than a first preset threshold, determine the target data stream class as the first data stream class corresponding to the current data stream.

In another possible implementation, the processor is further configured to:

if the comprehensive confidence corresponding to the target data stream class is less than a second preset threshold, send the feature information and the second data stream class of the current data stream to a second device through the communication interface, where the second preset threshold is greater than the first preset threshold; and receive, through the communication interface, second model data sent by the second device, where the second model data is used to describe a new content classification model obtained by the second device by training the content classification model based on the feature information and the second data stream class of the current data stream.

In the foregoing method, the content classification model is updated by using a determining result of the data stream class of the current data stream. Specifically, the second preset threshold is introduced. When the comprehensive confidence corresponding to the first data stream class is less than the second preset threshold, related information of the current data stream is sent to the second device for training, to obtain the new content classification model, so that a next determining result is more accurate.

In another possible implementation, the processor is further configured to:

if the comprehensive confidence corresponding to the target data stream class is less than a second preset threshold, update the content classification model based on the feature information and the second data stream class of the current data stream, to obtain a new content classification model, where the second preset threshold is greater than the first preset threshold.

In the foregoing method, the content classification model is updated by using a determining result of the data stream class of the current data stream. Specifically, the second preset threshold is introduced. When the comprehensive confidence corresponding to the first data stream class is less than the second preset threshold, training is performed based on related information of the current data stream, to obtain the new content classification model, so that a next determining result is more accurate.

In another possible implementation, after determining, based on the target correspondence and the common feature of the current data stream, the second data stream class corresponding to the current data stream, the processor is further configured to:

send the second data stream class corresponding to the current data stream to an operations support system OSS through the communication interface, where information about the second data stream class of the current data stream is used by the OSS to generate a traffic control policy for the current data stream.

That is, after the data stream class of the current data stream is determined, related information of the data stream class of the current data stream is notified to the OSS. In this way, the OSS can generate the traffic control policy for the current data stream based on the data stream class of the current data stream. For example, when the first data stream class of the current data stream is a video stream of video conference, the traffic control policy corresponding to the current data stream is defined as a policy of preferential transmission, that is, when a plurality of data streams are to be transmitted, the current data stream is preferentially transmitted.

In another possible implementation, the packet length includes one or more of an Ethernet frame length, an IP packet length, a transmission protocol packet length, and a header length in a packet, and a transmission protocol includes the transmission control protocol TCP and/or the user datagram protocol UDP.

It should be noted that, for implementation of the operations, refer to the corresponding descriptions in the method embodiment shown in FIG. 3.

Figure 10:
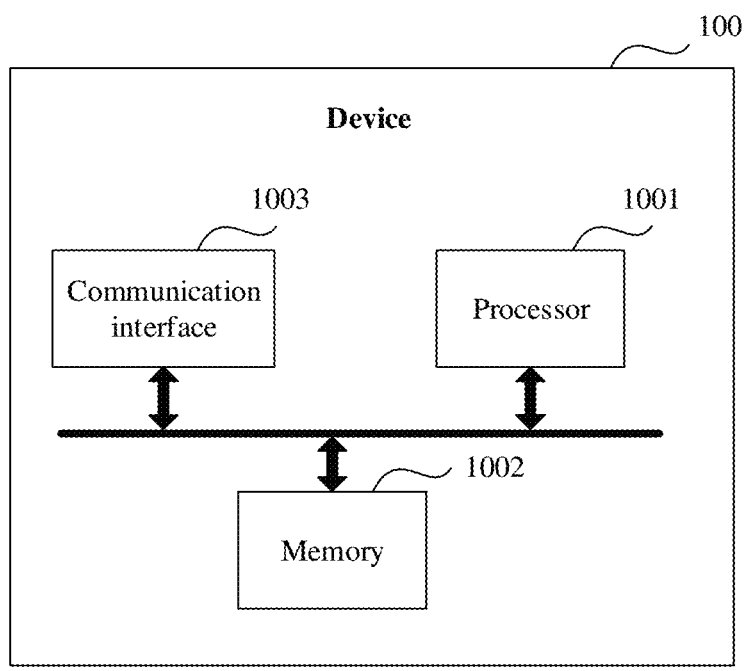
FIG. 10 is a schematic diagram of a structure of another data stream classification model updating device according to an embodiment of the present application

FIG. 10 shows a device too according to an embodiment of the present application. The device 100 may be the first device in the method embodiment shown in FIG. 3. The device too includes a processor toot, a memory 1002, and a communication interface tom. The processor toot, the memory 1002, and the communication interface tom are connected to each other through a bus.

The memory 1002 includes, but is not limited to, a RAM, a ROM, an EPROM, or a CD-ROM. The memory 1002 is configured to store related computer programs and data. The communication interface 1003 is configured to receive and send data.

The processor 1001 may be one or more CPUs. When the processor 1001 is one CPU, the CPU may be a single-core CPU, or may be a multi-core CPU.

The processor 1001 reads computer program code stored in the memory 1002, to perform the following operations:

receiving, through the communication interface, correction data that corresponds to a current data stream and that is sent by a third device, where the correction data corresponding to the current data stream includes packet information of the current data stream and a second data stream class corresponding to the current data stream, the second data stream class corresponding to the current data stream is determined by the third device based on a target correspondence and a common feature of the current data stream, and the target correspondence is a correspondence between a plurality of common features and a plurality of data stream classes;

if correction data corresponding to a total of M data streams is received from the third device, training a behavior classification model based on the correction data corresponding to the M data streams, to obtain a new behavior classification model, where the M data streams are an amount accumulated from a moment at which the behavior classification model becomes valid to a current moment or an amount accumulated within a preset time period, or a proportion of M in a total quantity of data streams that are transmitted after the behavior classification model becomes valid exceeds a preset threshold, where the M data streams include the current data stream; and sending first model data to the third device through the communication interface, where the first model data is used to describe the new behavior classification model, the behavior classification model is a model obtained based on packet information and data stream classes of a plurality of data stream samples, the behavior classification model is used to determine a data stream class of an input to-be-predicted data stream based on packet information of the to-be-predicted data stream, and the packet information includes one or more of a packet length, a packet transmission speed, a packet time interval, and a packet direction.

In the foregoing method, when a total of a specific amount of correction data is from the third device, a first device trains the behavior classification model based on the specific amount of correction data to obtain the new behavior classification model, and sends, to the third device when obtaining the new behavior classification model through training, information for describing the new behavior classification model, so that the third device updates the behavior classification model on the third device by using the information. In the foregoing method, the third device does not need to perform model training, but directly obtains the new behavior classification model based on a model training result from the first device. This helps the third device fully use computing resources to classify a data stream class.

In a possible implementation, the common feature is a well-known port number or a well-known domain name system DNS.

In another possible implementation, the correction data corresponding to the current data stream is sent by the third device when a first data stream class corresponding to the current data stream is different from the second data stream class corresponding to the current data stream, the first data stream class corresponding to the current data stream is determined by the third device based on the packet information and feature information of the current data stream, the behavior classification model, and a content classification model, the feature information includes one or more of a destination address and a protocol type, the content classification model is obtained based on feature information and one or more data stream class of one or more historical data streams, and the data stream class of the historical data stream is obtained based on the behavior classification model.

In another possible implementation, when training the behavior classification model based on the correction data corresponding to the M data streams, to obtain the new behavior classification model, the processor is specifically configured to:

train the behavior classification model based on the correction data corresponding to the M data streams and correction data corresponding to Y data streams, to obtain the new behavior classification model, where the Y data streams and the M data streams are from a same network; or the Y data streams and the M data streams are from at least two different networks, where the at least two different networks include two different local area networks, include two networks in different forms, or include two networks in different areas.

It may be understood that, generalization performance of the behavior classification model can be improved through training based on related information of data streams from different networks, to achieve a better prediction effect.

In another possible implementation, if the Y data streams and the M data streams are from the at least two different networks, when training the behavior classification model based on the correction data corresponding to the M data streams and the correction data corresponding to the Y data streams, to obtain the new behavior classification model, the processor is specifically configured to:

correct packet information of the Y data streams based on a difference between a network configuration of a second network to which the Y data streams belong and a network configuration of a first network to which the M data streams belong, to obtain corrected packet information of the Y data streams; and train the behavior classification model based on packet information of the M data streams, the corrected packet information of the Y data streams, second data stream classes corresponding to the M data streams, and second data stream classes corresponding to the Y data streams, to obtain the new behavior classification model.

In the method, packet information of the data streams from the different networks is normalized, so that the packet information of the data streams from the different networks is more comparable, and the behavior classification model obtained through training based on normalized packet information has better generalization performance and higher prediction accuracy.

In another possible implementation, the processor is further configured to:

receive, through the communication interface, the feature information and information about the second data stream class that are of the current data stream and that are sent by the third device;

train the content classification model based on the feature information and the second data stream class of the current data stream, to obtain a new content classification model; and send second model data to the third device through the communication interface, where the second model data is used to describe the new content classification model, the content classification model is a model obtained based on the feature information and the data stream class of the one or more historical data streams, the content classification model is used to estimate a data stream class of an input to-be-predicted data stream based on feature information of the to-be-predicted data stream, the data stream class of the historical data stream is obtained based on the behavior classification model, the behavior classification model is the model obtained based on the packet information and the data stream classes of the plurality of data stream samples, the packet information includes the one or more of the packet length, the packet transmission speed, the packet time interval, and the packet direction, and the feature information includes the one or more of the destination address and the protocol type.

In the foregoing method, in a process in which the third device classifies a data stream class by using the content classification model that has been obtained through training, if it is found that accuracy of the model is low, the third device triggers the first device to retrain the content classification model with reference to related data, and updates the content classification model on the third device after the new content classification model is obtained through training. This manner of iteratively updating the content classification model can meet differentiated requirements of different users, different networks, and different scenarios, and has better generality performance and commonality.

It should be noted that, for implementation of the operations, refer to the corresponding descriptions in the method embodiment shown in FIG. 3.

It should be noted that any apparatus embodiment described above is merely an example. The units described as separate parts may or may not be physically separate, and parts displayed as units may or may not be physical units, and may be located in one position, or may be distributed on a plurality of network units. A part or all of the modules may be selected based on actual needs to achieve the objectives of the solutions of embodiments. In addition, in the accompanying drawings of embodiments of the network device or the host provided in the present application, connection relationships between modules indicate that the modules have a communication connection to each other, which may be specifically implemented as one or more communication buses or signal cables. A person of ordinary skill in the art may understand and implement embodiments without creative efforts.

An embodiment of the present application further provides a chip system. The chip system includes at least one processor, memory, and interface circuit. The memory, the transceiver, and the at least one processor are interconnected through a line, and the at least one memory stores a computer program. When the computer program is executed by the processor, the method procedure shown in FIG. 3 is implemented.

An embodiment of the present application further provides a computer-readable storage medium. The computer-readable storage medium stores a computer program; and when the computer program is run on a processor, the method procedure shown in FIG. 3 is implemented.

An embodiment of the present application further provides a computer program product. When the computer program product runs on a processor, the method procedure shown in FIG. 3 is implemented.

In conclusion, in embodiments of this application, after the first data stream class is classified based on the behavior classification model, and the second data stream class is classified based on the preset correspondence about the common feature, if the first data stream class is different from the second data stream class, the correction data, namely, the training sample, for updating the behavior classification model is generated. The correction data is autonomously obtained by the device when the first data stream class corresponding to the current data stream is different from the second data stream class corresponding to the current data stream, and no manual labeling is required. Therefore, the efficiency of obtaining the sample data for training the behavior classification model is higher. In addition, the correction data includes the packet information and the accurate data stream class that are generated when the classification result of the behavior classification model is inaccurate. Therefore, the behavior classification model is subsequently updated based on the correction data, to obtain the behavior classification model with a more accurate classification effect.

Furthermore, the first data stream class corresponding to the current data stream may be specifically obtained based on the content classification model and the behavior classification model, and then the first data stream class is corrected to obtain the final data stream class of the current data stream. The behavior classification model is pre-obtained through training based on the packet information and the data stream classes of the plurality of data stream samples, and the content classification model is obtained through training based on the feature information of the data stream and the data stream class classified by the behavior classification model. Therefore, the feature information, the packet information, and the like are analyzed by using the content classification model and the behavior classification model, so that the first data stream class corresponding to the current data stream can be more accurately predicted. In addition, because the data stream class that is in the data stream sample and that is used for training the content classification model is classified by the behavior classification model, there is no need to collect a large amount of data required for training, to avoid the insufficient data integrity.

Moreover, in a process in which the third device classifies a data stream class by using the behavior classification model that has been obtained through training, if it is found by using an address correction model (including the correspondence about the common feature) that a deviation occurs on a classification result, when deviations occur for a plurality of times in total, the first device or the third device retrains the behavior classification model with reference to related data causing the deviations, and the behavior classification model on the third device is updated after the new behavior classification model is obtained through training. The iteratively updated behavior classification model can meet differentiated requirements of different users, different networks, and different scenarios, and has better generalization performance and commonality.

Furthermore, in the process in which the third device classifies the data stream class by using the content classification model that has been obtained through training, if it is found, through comparison between the comprehensive confidence and the preset update threshold $\theta_2$, that update is required, when the update is required for a plurality of times in total, the second device or the third device retrains the content classification model with reference to related data that causes the comprehensive confidence to be lower than $\theta_2$, and the content classification model on the third device is updated after the new content classification model is obtained through training. The iteratively updated content classification model can meet differentiated requirements of different users, different networks, and different scenarios, and has better generalization performance and commonality.

A person of ordinary skill in the art may understand that all or some of the processes of the methods in the foregoing embodiments may be implemented by a computer program instructing related hardware. The computer program may be stored in a computer-readable storage medium. When the computer program is run, the processes in the foregoing method embodiments are performed. The foregoing storage medium includes any medium that can store computer program code, such as a ROM, a random access memory RAM, a magnetic disk, or an optical disc.

In embodiments of the present application, "first" in the first device, the first confidence, the first data stream class, the first preset threshold, the first information, and the first record is merely used as a name identifier, and does not represent the first in sequence. The rule is also applicable to "second", "third", "fourth", and the like. However, "first" in the first identifier mentioned in embodiments of the present application represents the first in sequence. The rule is also applicable to "$N^{th}$".

The objectives, technical solutions, and benefits of the present application are further described in detail in the foregoing specific implementations. It should be understood that the foregoing descriptions are merely specific implementations of the present application, but are not intended to limit the protection scope of the present application. Any modification, replacement, or improvement made based on the technical solutions of the present application shall fall within the protection scope of the present application.

What is claimed is:

1. A method comprising:
   determining, by an electronic device in a communication system based on packet information of a current data stream and a behavior classification model, that the current data stream belongs to a first data stream class, wherein the packet information comprises one or more of a packet length, a packet transmission speed, a packet time interval, or a packet direction, and the behavior classification model is a model obtained through training based on packet information and data stream classes of a plurality of data stream samples;
   determining, by the electronic device based on a target correspondence and a common feature of the current data stream, that the current data stream belongs to a second data stream class, wherein the target correspondence is a correspondence between a plurality of common features and a plurality of data stream classes; and
   when the first data stream class is different from the second data stream class, obtaining, by the electronic device, correction data corresponding to the current data stream, wherein the correction data corresponding to the current data stream comprises the packet information of the current data stream and the second data stream class, and the correction data is used as a training sample to update the behavior classification model.

2. The method according to claim 1, wherein determining, based on the target correspondence and the common feature of the current data stream, that the current data stream belongs to the second data stream class comprises:
   when the common feature of the current data stream is same as a first common feature in the target correspondence, using a data stream class corresponding to the first common feature as the second data stream class.

3. The method according to claim 1, wherein after obtaining the correction data corresponding to the current data stream, the method further comprises:
   updating the behavior classification model based on the correction data, to obtain a new behavior classification model.

4. The method according to claim 3, wherein updating the behavior classification model based on the correction data, to obtain the new behavior classification model comprises:
   when obtaining correction data corresponding to M data streams since the behavior classification model has been used for classifying data streams, or within a preset time period, or with M/S exceeding a threshold, training the behavior classification model based on packet information of the M data streams and second data stream classes of the M data streams that are determined based on the target correspondence, to obtain the new behavior classification model, wherein M and S are integers greater than 1, S represents a quantity of data streams that have been communicated since the behavior classification model has been used, and the M data streams comprise the current data stream.

5. The method according to claim 1, wherein determining, based on the packet information of the current data stream and the behavior classification model, that the current data stream belongs to the first data stream class comprises:
   determining, based on the packet information and feature information of the current data stream, the behavior classification model and a content classification model, that the current data stream belongs to the first data stream class, wherein the feature information comprises a destination address or a protocol type, the content classification model is a model obtained based on feature information and at least one data stream class of one or more historical data streams, and the at least one data stream class of the one or more historical data streams is obtained based on the behavior classification model.

6. The method according to claim 5, wherein determining, based on the packet information and the feature information of the current data stream, the behavior classification model and the content classification model, that the current data stream belongs to the first data stream class comprises:
   obtaining, based on the packet information of the current data stream and the behavior classification model, at least one first confidence that is of the current data stream and that corresponds to at least one data stream class;
   obtaining, based on the feature information of the current data stream and the content classification model, at least one second confidence that is of the current data stream and that corresponds to the at least one data stream class; and
   determining the first data stream class of the current data stream based on the at least one first confidence and the at least one second confidence.

7. The method according to claim 6, wherein determining the first data stream class of the current data stream based on the at least one first confidence and the at least one second confidence comprises:
   calculating a comprehensive confidence corresponding to a target data stream class, based on a first confidence corresponding to the target data stream class, a weight value of the first confidence, a second confidence corresponding to the target data stream class, and a weight value of the second confidence, wherein the target data stream class is one of the at least one data stream class; and
   when the comprehensive confidence corresponding to the target data stream class is greater than a first preset threshold, determining the target data stream class as the first data stream class.

8. The method according to claim 7, wherein the method further comprises:
   when the comprehensive confidence corresponding to the target data stream class is less than a second preset threshold, updating the content classification model based on the feature information and the second data stream class of the current data stream, to obtain a new content classification model, wherein the second preset threshold is greater than the first preset threshold.

9. A network device comprising:
at least one processor; and
a non-transitory memory, coupled to the at least one processor and configured to store instructions that, when executed by the at least one processor, cause the network device to:
determine, based on packet information of a current data stream and a behavior classification model, that the current data stream belongs to a first data stream class, wherein the packet information comprises one or more of a packet length, a packet transmission speed, a packet time interval, or a packet direction, and the behavior classification model is a model obtained through training based on packet information and data stream classes of a plurality of data stream samples;
determine, based on a target correspondence and a common feature of the current data stream, that the current data stream belongs to a second data stream class, wherein the target correspondence is a correspondence between a plurality of common features and a plurality of data stream classes; and
obtain, when the first data stream class is different from the second data stream class, correction data corresponding to the current data stream, wherein the correction data corresponding to the current data stream comprises the packet information of the current data stream and the second data stream class of the current data stream, and the correction data is used as a training sample to update the behavior classification model.

10. The network device according to claim 9, wherein when executed by the at least one processor, the instructions further cause the network device to:
update, after obtaining the correction data corresponding to the current data stream, the behavior classification model based on the correction data, to obtain a new behavior classification model.

11. The network device according to claim 10, wherein when executed by the at least one processor, the instructions further cause the network device to:
when obtaining correction data corresponding to M data streams since the behavior classification model has been used for classifying data streams, or within a preset time period, or with M/S exceeding a threshold, train the behavior classification model based on packet information of the M data streams and second data stream classes of the M data streams that are determined based on the target correspondence, to obtain the new behavior classification model, wherein M and S are integers greater than 1, S represents a quantity of data streams that have been communicated since the behavior classification model has been used, and the M data streams comprise the current data stream.

12. The network device according to claim 9, wherein when executed by the at least one processor, the instructions further cause the network device to:
determine, based on the packet information and feature information of the current data stream, the behavior classification model and a content classification model, that the current data stream belongs to the first data stream class, wherein the feature information comprises a destination address or a protocol type, the content classification model is a model obtained based on feature information and one or more data stream classes of one or more historical data streams, and the one or more data stream classes of the one or more historical data streams are obtained based on the behavior classification model.

13. The network device according to claim 12, wherein when executed by the at least one processor, the instructions further cause the network device to:
obtain, based on the packet information of the current data stream and the behavior classification model, at least one first confidence that is of the current data stream and that corresponds to at least one data stream class;
obtain, based on the feature information of the current data stream and the content classification model, at least one second confidence that is of the current data stream and that corresponds to the at least one data stream class; and
determine the first data stream class of the current data stream based on the at least one first confidence and the at least one second confidence.

14. The network device according to claim 13, wherein when executed by the at least one processor, the instructions further cause the network device to:
calculate a comprehensive confidence corresponding to a target data stream class, based on a first confidence corresponding to the target data stream class, a weight value of the first confidence, a second confidence corresponding to the target data stream class, and a weight value of the second confidence, wherein the target data stream class is one of the at least one data stream class; and
determine, when the comprehensive confidence corresponding to the target data stream class is greater than a first preset threshold, the target data stream class as the first data stream class.

15. The network device according to claim 14, wherein when executed by the at least one processor, the instructions further cause the network device to:
update, when the comprehensive confidence corresponding to the target data stream class is less than a second preset threshold, the content classification model based on the feature information and the second data stream class of the current data stream, to obtain a new content classification model, wherein the second preset threshold is greater than the first preset threshold.

16. A non-transitory memory storing instructions that, when executed by at least one processor, cause a network device to:
determine, based on packet information of a current data stream and a behavior classification model, that the current data stream belongs to a first data stream class, wherein the packet information comprises one or more of a packet length, a packet transmission speed, a packet time interval, or a packet direction, and the behavior classification model is a model obtained through training based on packet information and data stream classes of a plurality of data stream samples;
determine, based on a target correspondence and a common feature of the current data stream, that the current data stream belongs to a second data stream class, wherein the target correspondence is a correspondence between a plurality of common features and a plurality of data stream classes; and
obtain, when the first data stream class is different from the second data stream class, correction data corresponding to the current data stream, wherein the correction data corresponding to the current data stream comprises the packet information of the current data stream and the second data stream class of the current data stream, and the correction data is used as a training sample to update the behavior classification model.

17. The non-transitory memory according to claim 16, wherein, when executed by the at least one processor, the instructions further cause the network device to:
update, after obtaining the correction data corresponding to the current data stream, the behavior classification model based on the correction data, to obtain a new behavior classification model.

18. The non-transitory memory according to claim 17, wherein when executed by the at least one processor, the instructions cause the network device to:
when obtaining correction data corresponding to M data streams since the behavior classification model has been used for classifying data streams, or within a preset time period, or with M/S exceeding a threshold, train the behavior classification model based on packet information of the M data streams and second data stream classes of the M data streams that are determined based on the target correspondence, to obtain the new behavior classification model, wherein M and S are integers greater than 1, S represents a quantity of data streams that have been communicated since the behavior classification model has been used, and the M data streams comprise the current data stream.

19. The non-transitory memory according to claim 16, wherein when executed by the at least one processor, the instructions further cause the network device to:
determine, based on the packet information and feature information of the current data stream, the behavior classification model and a content classification model, that the current data stream belongs to the first data stream class, wherein the feature information comprises a destination address or a protocol type, the content classification model is a model obtained based on feature information and one or more data stream classes of one or more historical data streams, and the one or more data stream classes of the one or more historical data streams are obtained based on the behavior classification model.

20. The non-transitory memory according to claim 19, wherein when executed by the at least one processor, the instructions further cause the network device to:
obtain, based on the packet information of the current data stream and the behavior classification model, at least one first confidence that is of the current data stream and that corresponds to at least one data stream class;
obtain, based on the feature information of the current data stream and the content classification model, at least one second confidence that is of the current data stream and that corresponds to the at least one data stream class; and
determine the first data stream class of the current data stream based on the at least one first confidence and the at least one second confidence.

\* \* \* \* \*